(12) United States Patent
Arikan et al.

(10) Patent No.: US 7,221,701 B2
(45) Date of Patent: May 22, 2007

(54) SYSTEM AND METHOD FOR CDMA COMMUNICATIONS

(75) Inventors: Orhan Arikan, Ankara (TR); Ahmet Kemal Ozdemir, Ankara (TR)

(73) Assignee: ALTRATEK, Inc., New York, NY (US)

( * ) Notice: Subject to any disclaimer, the term of this patent is extended or adjusted under 35 U.S.C. 154(b) by 764 days.

(21) Appl. No.: 10/265,525

(22) Filed: Oct. 7, 2002

(65) Prior Publication Data
US 2004/0042531 A1    Mar. 4, 2004

Related U.S. Application Data

(60) Provisional application No. 60/406,620, filed on Aug. 28, 2002.

(51) Int. Cl.
H04B 1/69 (2006.01)
H04B 1/707 (2006.01)
H04B 1/713 (2006.01)

(52) U.S. Cl. ............... 375/148; 375/140; 375/147
(58) Field of Classification Search .......... 375/140, 375/147, 148
See application file for complete search history.

(56) References Cited

U.S. PATENT DOCUMENTS

| | | | |
|---|---|---|---|
| 3,808,594 A * | 4/1974 | Cook et al. ............. | 342/201 |
| 3,827,629 A | 8/1974 | Max et al. | |
| 4,339,176 A | 7/1982 | Lee | |
| 4,389,092 A | 6/1983 | Tamura | |
| 4,440,472 A * | 4/1984 | Cohen .................. | 359/310 |
| 4,462,032 A | 7/1984 | Martin | |
| 4,468,093 A | 8/1984 | Brown | |
| 4,531,195 A | 7/1985 | Lee | |
| 4,764,891 A * | 8/1988 | Grinberg et al. ........ | 708/801 |
| 5,056,109 A | 10/1991 | Gilhousen et al. | |
| 5,103,459 A | 4/1992 | Gilhousen et al. | |
| 5,109,390 A | 4/1992 | Gilhousen et al. | |
| 5,193,094 A | 3/1993 | Viterbi | |
| 5,416,488 A | 5/1995 | Grover et al. | |

(Continued)

FOREIGN PATENT DOCUMENTS

JP        61212781        9/1986

OTHER PUBLICATIONS

Ozdemir, Ahmet Kemal, Efficient Computation of the Ambiguity Function and the Wigner Distribution on Arbitrary Line Segments, Circuits and Systems, 1999. ISCAS '99. Proceedings of the 1999 IEEE International Symposium on vol. 4, May 30-Jun. 2, 1999 pp. 171-174 vol. 4.*

(Continued)

*Primary Examiner*—David C. Payne
*Assistant Examiner*—Erin M. File
(74) *Attorney, Agent, or Firm*—Jones Day

(57) ABSTRACT

A system and method for spread spectrum communication primarily for use in mobile CDMA communication systems. The system receiver has simplified architecture, comprising a channel compensator and correlation detector. The channel compensator has a channel estimator and signal constructor. In a preferred embodiment, the channel estimator periodically computes the cross-ambiguity function of the transmitted and received pilot signals of the CDMA system using computationally efficient processing algorithms. The signal constructor uses the estimated multipath parameters to construct a new signal on which effects of the multipath channel is considerably mitigated.

28 Claims, 19 Drawing Sheets

U.S. PATENT DOCUMENTS

| | | | |
|---|---|---|---|
| 5,555,532 A | | 9/1996 | Sacha |
| 5,570,099 A | * | 10/1996 | DesJardins ................... 342/378 |
| 5,583,512 A | | 12/1996 | McEligot |
| 6,044,111 A | | 3/2000 | Meyer et al. |
| 6,073,100 A | * | 6/2000 | Goodridge, Jr. ............ 704/258 |
| RE36,791 E | * | 7/2000 | Heller ......................... 342/450 |
| 6,160,802 A | * | 12/2000 | Barrett ....................... 370/342 |
| 6,266,365 B1 | | 7/2001 | Wang et al. |
| 6,269,075 B1 | | 7/2001 | Tran |
| 6,389,003 B1 | * | 5/2002 | Barroso ...................... 370/342 |
| 6,512,737 B1 | * | 1/2003 | Agee .......................... 370/208 |
| 6,636,174 B2 | | 10/2003 | Arikan et al. |
| 6,650,653 B1 | | 11/2003 | Horng et al. |
| 6,665,332 B1 | * | 12/2003 | Carlson et al. ............. 375/130 |
| 6,731,622 B1 | * | 5/2004 | Frank et al. ................. 370/342 |
| 7,019,692 B2 | * | 3/2006 | Baugh et al. ............... 342/378 |
| 2002/0041645 A1 | * | 4/2002 | Saito et al. .................. 375/346 |
| 2002/0150150 A1 | * | 10/2002 | Kohli et al. ................. 375/150 |
| 2003/0020653 A1 | * | 1/2003 | Baugh et al. ............... 342/451 |
| 2003/0161415 A1 | | 8/2003 | Krupka |
| 2005/0032513 A1 | * | 2/2005 | Norman et al. ............. 455/423 |
| 2005/0141565 A1 | * | 6/2005 | Forest et al. ................ 370/503 |

OTHER PUBLICATIONS

Introduction of cross ambiguity function for elimination of crossterms in Wigner distribution of the third order P. Zavarsky, Introduction of cross ambiguity function for elimination of crossterms in Wigner distribution of the third order, Electronics Letters—Jan. 18, 1996—vol. 32, Issue 2, p. 94-95.*

Wikipedia, Wigner Quasi-Probaility Distribution, Uses of the Wigner Function Outside Quantum Mechanics, found Mar. 27, 2006 at http://en.wikipedia.org/wiki/Wigner_quasi-probability_distribution.*

Wikipedia, Intermediate Frequency, found Mar. 30, 2006 at http://en.wikipedia.org/wiki/Intermediate_frequency.*

Daniela Dragoman, Implementation of the spatial and the temporal corss-ambiguity function for waveguide fields and optical pulses, Feb. 10, 1999, Applied Optics vol. 38, No. 5□□.*

M.K. Simon, J. K. Omura, R. A. Scholtz, and B. K. Levitt, Spread Spectrum Communications Handbook, McGraw-Hill, Inc., 1994.

3rd Generation Partnership Project, Technical Specification Group Radio Access Networks, Deployment aspects (Release 4), 3GPP TR 25.943 V4.0.0, Jun. 2001.

P. M. Woodward, Probability and Information Theory, with Applications to Radar, Chapter 7, New York: Pergamon Press Inc., 1953.

R. E. Blahut, W. Miller and Jr. C. H. Wilcox, Radar and Sonar, Springer—Verlag, vol. 32, 1991.

A. K. Özdemir and O. Arikan, "Fast computation of the ambiguity function and the Wigner distribution on arbitrary line segments", IEEE trans. Signal Process., vol. 49, No. 2, pp. 381-393, Feb. 2001.

A. K. Özdemir and O. Arikan, "Efficient computation of the ambiguity function and the Wigner distribution on arbitrary line segments", in Proc. IEEE Int. Symp. Circuits and Systems, vol. IV, pp. 171-174, May 1999.

H. M. Ozaktas, O. Arikan, M. A. Kutay and G. Bozdagi, "Digital computation of the fractional Fourier transform", IEEE Trans. Signal Process., vol. 44, No. 9, pp. 2141-2150, Sep. 1996.

L. R. Rabiner, R. W. Schafer and C. M. Rader, "The Chirp z-Transform Algorithm", IEEE Transactions on Audio and Electroacoustics, vol. AU-17, No. 2, pp. 86-92, Jun. 1969.

J. Talvitie, et al., "Performance of Pilot Carrier Based Doppler Compensation for CDMA Land Mobile Satellite Links," Spread Spectrum Techniques and Application Proceedings, 1996, IEEE 4th International Symposium on, vol. 3, pp. 1156-1161, 1996.

I. D. Faux and M.J. Pratt, Computational Geometry for Design and Manufacture, Ellis Horwood 1979.

J. D. Foley, A. VanDam, S.K. Feiner, J.F. Hughes and R. L. Phillips, Introduction to Computer Graphics, Addison-Wesley 1994.

D. F. Rogers and J. A. Adams, Mathematical Elements for Computer Graphics, 2nd edition, McGraw-Hill 1989.

J. G. Proakis, Digital Communications, McGraw-Hill, NY, 1995.

V. Namias, "The fractional Fourier transform and its application in quantum mechanics," J. Inst. Maths. Applics., vol. 25, pp. 241-265, 1980.

W. Lohmann and B. H. Soffer, "Relationships between the Radon-Wigner and fractional Fourier transforms", J. Opt. Soc. Am. A, vol. 11, pp. 1798-1801, 1994.

I. Raveh and D. Mendlovic, "New properties of the Radon transform of the cross-Wigner/ambiguity distribution function", IEEE Trans. Signal Process., vol. 47, No. 7, pp. 2077-2080, Jul. 1999.

D. Mendlovic and H. M. Ozaktas, "Fractional Fourier transforms and their optical implementation: I" J. Opt. Soc. Am. A, vol. 10, pp. 1875-1881, 1993.

H. M. Ozaktas and D. Mendlovic, "Fractional Fourier transforms and their optical implementation: II", J. Opt. Soc. Am. A, vol. 10, No. 12, pp. 2522-2531, 1993.

L. B. Almedia, "The fractional Fourier transform and time-frequency Representations", IEEE Trans. Signal Process., vol. 42, No. 11, pp. 3084-3091, Nov. 1994.

L. Cohen, "Time-frequency distributions—A review", Proc. IEEE, vol. 77, No. 7 pp. 941-981, Jul. 1989.

R. N. Bracewell, The Fourier Transform and its Applications, McGraw-Hill Book Company, pp. 356-381, 1978.

G. H. Golub and C. F. Van Loan, Matrix Computations, Baltimore: John Hopkins University Press, pp. 206-209, 222-227, 236-241, 248-253, 256-259, 1996.

P. W. East (ed.), Advanced ESM Technology, Microwave Exhibitions and Publishers Ltd., 1988.

V. G. Nebabin, Methods and Techniques of Radar Recognition, Artech House, Inc., pp. 106-125, 1995.

R. E. Kalman, "A new approach to linear filtering and prediction problems", J. Basic Engineering, Trans. ASME Series D, vol. 82, pp. 35-45, 1960.

Per-Olof Gutman and Mordekhai Velger, "Tracking Targets Using Adaptive Kalman Filtering", IEEE Trans. Aerospace and Electronic Systems, vol. 26, No. 5, pp. 691-699, Sep. 1990.

IBM Tech. Discl. Bull. (vol. 28, No. 9; pp. 4023-4025); "Processing the Echo from Range-Dependent Multiplexed Pulses in Range-Doppler Radar"; Published Feb. 1, 1986; IBM Corp.; Armonk, NY.

IBM Tech. Discl. Bull. (vol. 36, No. 1; pp. 226-227); "Computing the Aliased Ambiguity Surface"; Published Jan. 1, 1993; IBM Corp.; Armonk, NY.

D. Lush, "Airborne Radar Analysis Using the Ambiguity Function"; Proceedings of the IEEE International Radar Conference; pp. 600-605; copyrighted in the year 1990. IEEE Pub. No. CH2882-9/90/0000-0600.

F. Hlawatsch et al., "The Ambiguity Function of a Linear Signal Space and its Application to Maximum-Likelihood Range/Doppler Estimation"; copyrighted in the year 1992; IEEE Pub. No. 0-7803-0805-0/92.

A.V. Dandawate et al., "Differential delay-Doppler estimations using second and higher-order ambiguity functions," 140 IEEE Proceedings 410-18 (Dec. 1993).

M. Rendas et al., "Ambiguity in Radar and Sonar," 46 IEEE Transactions on Signal Processing 294-305 (Feb. 1998).

C.Y. Yin et al., "Performance Analysis of the Estimation of Time Delay and Doppler Stretch by Wideband Ambiguity Function," IEEE Publication 0-7803-4308-5/98 452-55 (1998).

A. Dogandzic et al., "Estimating Range, Velocity, and Direction with a Radar Array," IEEE Publication 0-7803-5041-3/99 2773-76 (1999).

W.K. Chung et al., "Pulse-Diverse Radar Waveform Design for Accurate Joint Estimation of Time Delay and Doppler Shift," Proceedings of the IEEE International Conference on Acoustics, Speech, and Signal Processing 3037-40 (2000).

A. Dogandzic et al., "Cramer-Rao Bounds for Estimating Range, Velocity, and Direction with a Sensor Array," IEEE Publication 0-7803-6339-6/00 370-74 (2000).

Misc. Prior Art Search Results (Patent Material-related search, Jul. 8, 2004; IEEE Searches, 2004).

European Patent Office Communication, dated Mar. 2, 2006 with Supplementary European Search Report dated Feb. 22, 2006, App. No. 01942045.4-2220 PCT/US0118408.

J. C. Wood and D. T. Barry, "Tomographics time-frequency analysis and its application toward time-varying filtering and adaptive kernel design for multiple component linear-fm signals," IEEE Trans. Signal Process., vol. 42, pp. 2094-2104, Aug. 1994.

J. C. Wood and D. T. Barry, "Linear signal synthesis using the Radon-Wigner transform," IEEE Trans. Signal Process., vol. 42, pp. 2105-2166, Aug. 1994.

J. C. Wood and D. T. Barry, "Radon transformation of time-frequency distributions for analysis of multicomponent signals," IEEE Trans. Signal Process., vol. 42, pp. 3166-3177, Nov. 1994.

R. Price, et al., A Communication Technique for Multipath Channels, 46 Proc. Inst. Rad. Eng. 555-70 (Mar. 1958).

PCT International Search Report mailed Apr. 22, 2004 for Int'l Application No. PCT/US2003/26848.

PCT International Preliminary Examination Report completed May 20, 2004 for Int'l Application No. PCT/US2003/26848.

PCT International Search Report mailed Aug. 20, 2001 for Int'l Application No. PCT/US2001/18408.

PCT International Preliminary Examination Report completed Mar. 28, 2002 for Int'l Application No. PCT/US2001/18408.

Communication from the European Patent Office dated May 24, 2006 for European Application No. 01942045.4.

A.J. Viterbi, CDMA: Principles of Spread Spectrum Communication, pp. 77-96, 179-233, Addison-Wesley Publishing, 1995.

G. Cooper et al., Modern Communications and Spread Spectrum, Chapter 12, McGraw-Hill Book Co., 1986.

* cited by examiner

Object of the algorithm:

Given samples $r[n] \triangleq r(n/(2\Delta_r))$ and $s[n] \triangleq s(n/(2\Delta_r))$, $-N \leq n \leq N-1$, of the analog signals $r(t)$ and $s(t)$ obtained at twice the Nyquist's rate, to approximate $N'$ samples of the cross ambiguity function of $r(t)$ and $s(t)$ along the line segment $L_A$ as shown in Fig. 15

Steps of the algorithm:

if a radial slice then $r_{a+1}[n] := \{\mathcal{F}^{a+1}r\}(n/(2\Delta_r))$     for $-N \leq n \leq N-1$     discrete fractional Fourier transform.

$s_{a+1}[n] := \{\mathcal{F}^{a+1}s\}(n/(2\Delta_r))$     for $-N \leq n \leq N-1$     discrete fractional Fourier transform.

$p_{a+1}[n] := r_{a+1}[n]s_{a+1}^*[n]$     for $-N \leq n \leq N-1$ else $\tilde{r}[n] \;\;\; := r(n/\Delta_r + \tau_o/2)e^{-j\pi\nu_o n/\Delta_r}$     for $-N/2 \leq n \leq N/2-1$ $\tilde{s}[n] \;\;\; := s(n/\Delta_r - \tau_o/2)e^{j\pi\nu_o n/\Delta_r}$     for $-N/2 \leq n \leq N/2-1$ $\tilde{r}_{a+1}[n] := \{\mathcal{F}^{a+1}\tilde{r}\}(n/(2\Delta_r))$     for $-N \leq n \leq N-1$     discrete fractional Fourier transform.

$\tilde{s}_{a+1}[n] := \{\mathcal{F}^{a+1}\tilde{s}\}(n/(2\Delta_r))$     for $-N \leq n \leq N-1$     discrete fractional Fourier transform.

$p_{a+1}[n] := \tilde{r}_{a+1}[n]\tilde{s}_{a+1}^*[n]$     for $-N \leq n \leq N-1$ end if $A_{rs}(\tau_k, \nu_k) := \dfrac{1}{2\Delta_r} \displaystyle\sum_{n=-N}^{N-1} p_{a+1}[n]e^{j\frac{\pi}{\Delta_r}\lambda_k n}$     for $0 \leq k \leq N'-1$     by using chirp-z transform algorithm [].

where $(\tau_k, \nu_k) \triangleq (\tau_o + \lambda_k \cos\phi, \nu_o + \lambda_k \sin\phi)$ and $\lambda_k \triangleq \lambda_i + k\frac{\lambda_f - \lambda_i}{N'-1}$.

Fig. 17

SYSTEM AND METHOD FOR CDMA COMMUNICATIONS

This application claims the priority of provisional application Ser. No. 60/406,620, filed on Aug. 28, 2002, which is hereby incorporated by reference.

FIELD OF THE INVENTION

The present invention generally pertains to Code Division Multiple Access (CDMA) communications, also known as spread-spectrum communications. More particularly, the invention is directed to systems and methods using fast computation of multipath propagation parameters for improved communication with users, especially mobile users.

BACKGROUND OF THE INVENTION

Mobile communication has become a necessity in the life of modern people. CDMA is one of the most successful digital wireless technologies that have been developed and employed to this end in many countries around the world. The reasons for the success of CDMA include that it is an advanced digital technology that can offer about 7 to 10 times the capacity of analog technologies and about 6 times the capacity of other digital technologies, such as Time Division Multiple Access (TDMA). The speech quality provided by CDMA systems is superior to any other digital cellular technology, particularly in difficult radio environments, such as dense urban areas and mountainous regions.

In a CDMA system, all users share the time and frequency domains as a base station simultaneously transmits distinct information signals to multiple subscriber mobile stations over a single frequency band. In particular, prior to transmission, the base station multiplies the individual information signal intended for each of the mobile stations by a unique signature sequence, referred to as a pseudo-noise (PN) sequence. This PN sequence can be formed by multiplying a long pseudo-noise sequence with a time offset, which is used to differentiate the various base stations in the network, together with a short code unique to each mobile station. Typically, the long code sequence is generated by a shift register, while the short code sequence can be chosen as an orthogonal code, such as the Walsh codes. The use of such orthogonal codes and their corresponding benefits are outlined in U.S. Pat. Nos. 5,103,459 and 5,193,094, which are incorporated herein by reference.

The multiplication of the information signal by the signature sequence spreads the spectrum of the signal by increasing the rate of transmission from the bit rate of the information-carrying signal to what is known as the chip rate. This effect is known as the spreading the spectrum of the information signal, hence the term spread spectrum communication. Spread spectrum signals from the mobile users are accumulated and then transmitted simultaneously by the base station.

Upon receipt, each mobile station de-spreads the received spread spectrum signal by multiplying the received signal by the mobile station's assigned unique signature sequence. The result is then integrated to isolate the information signal intended for the particular mobile station from the other signals intended for other mobile stations. This way, the previously-spread information sequence of that particular mobile user is mapped back to the original information sequence, while information sequences corresponding to the other users remain occupying a large spectral band and appear as noise. The structure and operation of CDMA systems are well known. See, e.g., Andrew J. Viterbi, CDMA: Principles of Spread Spectrum Communication, Addison-Wesley Publishing, 1995; Marvin K. Simon, Jim K. Omura, Robert A. Scholtz, and Barry K. Levitt, Spread Spectrum Communications Handbook, McGraw-Hill, Inc., 1994, incorporated herein for background.

One of the major advantages of CDMA systems over other multiple-access telecommunications systems is the ability of CDMA systems to exploit path diversity of the incoming radio-frequency (RF) signal. The CDMA signal is communicated from a transmitter to a receiver via a channel including several independent paths, referred to as "multipaths", illustrated in FIG. 1. Each multipath represents a distinct route that the information signal takes between the transmitter and receiver. The transmitted signal thus appears at the receiver as a plurality of multipath signals or "multipaths". Each multipath may arrive at the receiver with an arbitrary timing delay, and may have a different signal strength at any time due to signal fading. In a typical communications system the diversity of multipath signals may lead to significant signal interference.

By means of background, consider the multipaths shown in FIG. 1. In the case of a non-stationary transmitter or receiver, in addition to different signal strength and timing delay, each received multipath signal may have a different Doppler shift. The Doppler shift in a signal is known as a change in the frequency of an electromagnetic wave when transmitter or receiver are in motion relative to each other. FIGS. 2A and 2B illustrate the effect of the multipath channel on a short segment of a pilot signal transmitted in a hilly terrain, while FIGS. 3A and 3B illustrate the same effect for an urban environment. In particular, FIG. 2A and FIG. 3A illustrate short segments of the inphase and the quadrature components of the transmitted noise-free pilot channel signal; FIGS. 2B and 3B illustrate the corresponding inphase and quadrature components of the received signal.

The propagation parametes of the signals in FIGS. 2A,B and 3A,B are given in Tables 1 and 2, respectively, which are taken from "3rd Generation Partnership Project," Technical Specification Group Radio Access Networks, *Deployment aspects* (Release 4), 3GPP TR 25.943 V4.0.0, June 2001, incorporated herein for background.

TABLE 1

Channel for hilly terrain area

| Tap number | Relative time (µs) | average relative power (dB) |
| --- | --- | --- |
| 1 | 0 | −3.6 |
| 2 | 0.356 | −8.9 |
| 3 | 0.441 | −10.2 |
| 4 | 0.528 | −11.5 |
| 5 | 0.546 | −11.8 |
| 6 | 0.609 | −12.7 |
| 7 | 0.625 | −13.0 |
| 8 | 0.842 | −16.2 |
| 9 | 0.916 | −17.3 |
| 10 | 0.941 | −17.7 |
| 11 | 15.000 | −17.6 |
| 12 | 16.172 | −22.7 |
| 13 | 16.492 | −24.1 |
| 14 | 16.876 | −25.8 |
| 15 | 16.882 | −25.8 |
| 16 | 16.978 | −26.2 |
| 17 | 17.615 | −29.0 |
| 18 | 17.827 | −29.9 |
| 19 | 17.849 | −30.0 |
| 20 | 18.016 | −30.7 |

TABLE 2

Channel for urban area

| Tap number | Relative time (μs) | average relative power (dB) |
|---|---|---|
| 1 | 0 | −5.7 |
| 2 | 0.217 | −7.6 |
| 3 | 0.512 | −10.1 |
| 4 | 0.514 | −10.2 |
| 5 | 0.517 | −10.2 |
| 6 | 0.674 | −11.5 |
| 7 | 0.882 | −13.4 |
| 8 | 1.230 | −16.3 |
| 9 | 1.287 | −16.9 |
| 10 | 1.311 | −17.1 |
| 11 | 1.349 | −17.4 |
| 12 | 1.533 | −19.0 |
| 13 | 1.535 | −19.0 |
| 14 | 1.622 | −19.8 |
| 15 | 1.818 | −21.5 |
| 16 | 1.836 | −21.6 |
| 17 | 1.884 | −22.1 |
| 18 | 1.943 | −22.6 |
| 19 | 2.048 | −23.5 |
| 20 | 2.140 | −24.3 |

As illustrated in FIGS. 2A, B and 3A, B, although there is no interference or noise the received pilot signals differ considerably from the transmitted ones. Note that for better visualization of the phase modulation structure on the transmitted pilot signal commonly used channel filtering has not been performed.

Traditional CDMA systems employ "rake" receivers in mobile units and base stations to exploit this path diversity. Rake receivers estimate the timing delay introduced by each of one or more multipaths in comparison with some reference e.g., line-of-sight delay), and then use the estimated timing delays to receive the multipaths that have the highest signal strength. A typical rake receiver includes a number (e.g., three to six) of rake branches or "fingers". Each finger is an independent receiver unit, which assembles and demodulates one received multipath that is assigned to the finger. A rake receiver also includes a separate "searcher," which searches out different signal components of an information signal that was transmitted using the assigned signature sequence of the receiver, and detects the phases of the different signal components. The timing of each finger is controlled such that it is correlated with a particular multipath, which arrived at the receiver with a slightly different delay and was found by the searcher. Thus, each finger is "assigned" to a particular multipath by controlling its timing to coincide with arrival of the multipath. The demodulated output from each finger, representing one multipath, is then combined into a high-quality output signal, which combines the energy received from each multipath that was demodulated. The implementation of rake receivers is generally known for both forward and reverse CDMA channels. See, e.g., R. Price and P. E. Green, Jr., A Communication Technique for Multipath Channels, 46 Proc. Inst. Rad. Eng. 555–70 (March 1958); G. Cooper and C. McGillem, Modern Communications and Spread Spectrum, Chapter 12, McGraw-Hill, NY, 1986 incorporated herein for background and, among others, U.S. Pat. Nos. 5,109,390; 6,269,075; and 6,266,365, which patents are incorporated herein for all purposes.

In general, rake receivers estimate the channel using a searcher having a ½ chip resolution (i.e., −0.25/+0.25 chip resolution), and the fingers are assigned using the same resolution. The resolution of the finger assignment creates a timing misalignment between the received signal and the pseudo-noise (PN) sequence generated locally in the finger which results in signal-to-noise ratio (SNR) degradation, or degraded Frame Error Rate (FER) performance. For example, with ½ chip resolution for the searcher and the finger assignment, the resulting timing misalignment of 0.25 chip causes a SNR degradation on the order of 1 dB. Although receivers typically include a delay-locked loop (DLL) to correct such assignment errors, the loss due to the initial timing mis-alignment becomes significant in the dynamic environments faced by CDMA mobile stations, where finger re-assignments may be performed as often as every 5 to 10 frames. The DLL, which typically requires on the order of 2 frames to correct initial timing mis-alignments, is too slow to cause the timing mis-alignment of the initial finger assignment to have a non-negligible effect on receiver performance.

Thus, in existing CDMA systems the fingers of a rake receiver, which are formed by parallel correlators or matched filters, are used to deal with rapid changes in the multipath structure of the received signal, while a plurality of DLLs are used to deal with slight changes in the phase of the spreading waveform caused by the Doppler shift. Rake receivers with multiple DLL's on each fingers perform acceptably when the individual DLL's have to track the phase of a single multipath component. However, their performance degrades sharply when two or more multipath components of about the same amplitude arrive within a chip duration with different Doppler shifts. Since this is the expected case in an urban communication environment, it is a severe limiting factor in the successful deployment of the communication systems.

These above problems are aggravated by the fact that new generation communication systems are aiming at providing enhanced communication service for mobile users, involving higher bit rates communications. For this purpose, standardization efforts for the third generation (3G) communication systems set very demanding communication standards for mobile users. Although there are differences in various standardization approaches, the CDMA-based communication plays a central role in 3G systems. For instance, in the standard for 3G cdma2000 system a CDMA air interface is used to provide wireline-quality voice service and high-speed data services ranging from 144 kilobits per second (Kbps) for mobile users to 2 megabits per second (Mbps) for stationary users. In the 1×EV-DO standard, which is also referred to as the High Data Rate (HDR), the communication rates ranges from 38.4 Kbps to 2457.6 Kbps, respectively. Likewise, in wideband CDMA (W-CDMA) communication standard the communication rates can be as high as 2072 Kbps.

One approach to minimizing the performance problems associated with timing mis-alignments caused by the initial finger assignment in a CDMA system with rake receivers is to use searchers with improved resolution to estimate parameters of the channel. For example, a searcher having ¼ or ⅛ chip resolution could be used. However, the hardware implementation of such high-resolution searchers are more complex than the implementation of ½ chip resolution searchers, and would not be economical or practical for the construction of CDMA mobile stations.

The present invention is directed to an improved system and method in which the multipath parameters are computed in a fast and efficient manner, providing significant improvement over the prior art.

In particular, the 3rd Generation Partnership Project publication mentioned above indicates that the propagation of radio waves in a mobile user environment can be described by multiple paths caused by reflection and scattering of the transmitted signals. As noted, if the user is non-stationary, the signals propagated on each path exhibit a Doppler shift. Since the effective velocity of the mobile user and the base station may differ for each path, the actual Doppler shifts on each path may be different.

The following discussion is illustrated by signal propagation models used in accordance with the present invention. In particular, the received signals at a stationary and a mobile receivers will differ. Thus, if the transmitted signal is denoted as $s(t)e^{j2\pi f_o t}$, in which $s(t)$ is the information carrying signal modulated on a carrier frequency $f_o$, the received signal at a stationary receiver will be $$r_{RF,stationary,k}(t) = C_k s(t-\tau_k) e^{j2\pi f_o t},$$

in which $C_k$ is a complex constant and the delay $\tau_k$ is given by $\tau_k = R_k/c_o$ in terms of the separation $R_k$ between the transmitter and receiver, and the speed of light $c_o$. However, if the receiver is moving at a speed $v_k$ away from the transmitter, the received signal will be $$r_{RF,k}(t) = r_{RF,stationary,k}((1-v_k/c_o)t).$$

An expanded version of the forgoing expression provides a greater insight into the Doppler effect on the transmitted signal $s(t)$, $$r_{RF,k}(t) = C_k s((1-v_k/c_o)t-\tau_k) e^{j2\pi f_o(t-v_k/c_o t)} = C_k s((1-v_k/c_o)t-\tau_k) e^{j2\pi(f_o-v_k)t} \approx C_k s(t-\tau_k) e^{j2\pi(f_o-v_k)t}, \quad (1)$$

in which the Doppler shift $v_k = f_o v_k/c_o$. From this expression it follows that the Doppler shift is approximately equivalent to a shift in carrier frequency $f_o$.

In a multipath channel, the received signal can be approximated as:

$$r_{RF}(t) = \sum_{k=1}^{N} C_k s(t-\tau_k) e^{j2\pi(f_0-v_k)t}. \quad (2)$$

where N is the number of distinct propagation paths each having amplitude $C_K$, time delay $\tau_K$, and effective Doppler shift $v_K$, which are also known as propagation parameters. Typically, these propagation parameters change dynamically in time, because individual multipath components arrive at the receiver within a short time, e.g., a few microseconds. For instance, according to the 3rd Generation Partnership Project, in a hilly terrain and urban environments, there may be as many as 20 multipath components that may arrive within about 18.0 and 2.1 microseconds. In practice, the multipath signal components that are reflected in the close proximity of the receiver are detected by the receiver at about the same time, but with highly varying Doppler shifts. Furthermore, for a rapidly moving mobile user, the positions of the reflectors and their corresponding delay and Doppler shifts change considerably over short time intervals. Thus, although over very short time intervals the spectrum of the received signal from the close proximity of the mobile user has distinct spectral components and can be approximated as shown above, the time-averaged spectrum shows continuum-like spread, which is known as the Doppler spread.

Accordingly, the model in Eq. (2) can be used to describe multipath propagation over relatively short time durations. In wireless communication applications, such duration may be about 100 msecs, although it should be apparent the duration can be selected based on the particular application.

In accordance with one aspect, the present invention provides systems and methods for the estimation of the multipath propagation parameters that can be conducted over a short time interval and can be refreshed frequently. In accordance with another aspect, for the purpose of estimating the multipath propagation parameters, the present invention uses pilot signals of the base and mobile stations. Since these signals are used in the synchronization of the base and the mobile stations, they are commonly used in the wireless communication systems. The use of pilot signals in wireless communication systems was illustrated in FIGS. 2A, B and 3A, B and are further disclosed, for example, in U.S. Pat. Nos. 5,056,109 and 5,103,459, which are incorporated herein for all purposes. The present invention is based in part of the disclosure of U.S. patent application Ser. No. 09/875116, filed Jun. 6, 2001 to the coinventors of this patents, which application is incorporated herein by reference.

The interested reader is also directed to the disclosure of the following publications, which are incorporated by reference for background. Reference numerals used in the following description correspond to the numbering in the listing below.

[1] 3rd Generation Partnership Project, Technical Specification Group Radio Access Networks, *Deployment aspects* (Release 4), 3GPP TR 25.943 V4.0.0, June 2001.

[2] P. M. Woodward, *Probability and Information Theory, with Applications to Radar*, New York: Pergamon Press Inc., 1953.

[3] R. E. Blahut, W. Miller and Jr. C. H. Wilcox, *Radar and Sonar*, Springer-Verlag, vol. 32, 1991.

[4] A. K. Özdemir and O. Arikan, "Fast computation of the ambiguity function and the Wigner distribution on arbitrary line segments", *IEEE trans. Signal Process.*, vol. 49, pp. 381–393, February 2001.

[5] A. K. Özdemir and O. Arikan, "Efficient computation of the ambiguity function and the Wigner distribution on arbitrary line segments", in *Proc. IEEE Int. Symp. Circuits and Systems*, vol. IV, pp. 171–174, May 1999.

[6] H. M. Ozaktas, O. Arikan, M. A. Kutay and G. Bozdagi, "Digital computation of the fractional Fourier transform", *IEEE Trans. Signal Process.*, vol. 44, no. 9, pp. 2141–2150, September 1996.

[7] L. R. Rabiner, R. W. Schafer and C. M. Rader, "The chirp z-transform algorithm and its applications", *Bell Syst. Tech. J.*, vol. 48, pp. 1249–1292, May 1969.

[8] J. Talvitie and G. Povey, "Performance of Pilot Carrier Based Doppler Compensation for CDMA Land Mobile Satellite Links", *Spread Spectrum Techniques and Applications Proceedings*, 1996, IEEE 4th International Symposium on, vol. 3, pp. 1156–1161, 1996.

[9] I. D. Faux and M. J. Pratt, *Computational Geometry for Design and Manufacture*, Ellis Horwood 1979.

[10] J. D. Foley, A. VanDam, S. K. Feiner, J. F. Hughes and R. L. Phillips. *Introduction to Computer Graphics*, Addison Wesley 1994.

[11] D. F. Rogers and J. A. Adams, *Mathematical Elements for Computer Graphics*, 2nd edition, McGraw Hill 1989.

[12] Andrew J. Viterbi, CDMA: *Principles of Spread Spectrum Communication*, Addison-Wesley Publishing, 1995.

[13] Marvin K. Simon, Jim K. Omura, Robert A. Scholtz, and Barry K. Levitt, Spread Spectrum Communications Handbook, McGraw-Hill, Inc., 1994.

[14] G. Cooper and C. McGillem, *Modern Communications and Spread Spectrum*, Chapter 12, McGraw-Hill, NY, 1986.

[15] John G. Proakis, *Digital Communications*, McGraw-Hill, NY, 1995.

[16] J. C. Wood and D. T. Barry, "Tomographic time-frequency analysis and its application toward time-varying filtering and adaptive kernel desing for multi-component linear-fin signals," *IEEE Trans. Signal Process.*, vol. 42, pp. 2094–2104, August 1994.

[17] J. C. Wood and D. T. Barry, "Linear sinal synthesis using the Radon-Wigner trasnform," *IEEE Trans. Signal Process.*, vol. 42, pp. 2105–2166, August 1994.

[18] J. C. Wood and D. T. Barry, "Radon transformation of time-frequency distributions for analysis of multicomponent signals," *IEEE Trans. Signal Process.*, vol. 42, pp. 3166{3177, November 1994.

[19] V. Namias, "The fractional Fourier transform and its application in quantum mechanics," *J. Inst. Maths. Applics.*, vol. 25, pp. 241–265, 1980.

[20] L. R. Rabiner, R. W. Schafer, and C. M. Rader, "The chirp z-transform algorithm and its applications," *Bell Syst. Tech. J.*, vol. 48, pp. 1249–1292, May 1969.

SUMMARY OF THE INVENTION

The present invention provides a novel system and method for computing multipath channel parameters for use in spread spectrum communication systems utilizing pilot signaling. More specifically, the invention provides for estimation of the multipath propagation parameters based on pilot signals transmitted between a transmitter and a receiver, and for compensation of time-delays, Doppler shifts and phases associated with multipath propagation of the received information-carrying signals.

In a preferred embodiment, the system of the present invention comprises a receiver having a channel compensator and a correlator detector. The channel compensator in accordance with the invention is used for estimation of multipath propagation parameters and for signal construction. In a preferred embodiment, multipath signal estimation is done by computing a cross-ambiguity function of the transmitted pilot and the received signals to determine such multipath parameters as the number of propagation paths, their amplitudes, phases, respective delays, and Doppler shifts. A signal constructor in turn uses the estimated propagation parameters to compensate the effect of the multipath propagation on the received information signals. In particular, the signal constructor of the present invention compensates the propagation channel effects by forming a signal, which is the sum of amplitude-scaled, phase-corrected, time- and frequency-shifted versions of the received signal to improve the performance of the spread spectrum communication system. The channel compensator computes the various multipath parameters over a predetermined short time interval selected on the basis of the particular wireless communication application. The output from the channel compensator used in accordance with this invention is provided to a correlation detector that performs symbol decisions by using correlation and integration operations, as known in the CDMA art.

In particular, in one aspect the invention is a method for wireless communication in a multipath environment, comprising the steps of: a) at a receiver having stored at least one pilot signal associated with a transmitter, receiving signals corresponding to propagation paths of a signal transmitted from a transmitter; b) estimating a set of propagation parameters for at least one propagation path, the step of estimating comprising: (i) generating windowed versions of a stored pilot signal and the received signals, (ii) computing a cross-ambiguity function of the generated windowed signal versions, (iii) estimating a set of propagation parameters for the at least one propagation path based on information about one or more peaks of the computed cross-ambiguity function; and c) compensating effects of multipath propagation on information-carrying signals from the transmitter using the estimated set of propagation parameters for the at least one propagation path.

In another aspect, the invention is a method for estimating channel propagation parameters, comprising the steps of: a) at a receiver having a copy of a predetermined transmitter signal, receiving signals corresponding to propagation paths of the predetermined transmitter signal; b) computing a cross-ambiguity function of the receiver copy of the transmitter signal and received signals; and determining one or more local peaks of the computed cross-ambiguity function, each peak providing an estimate of a set of channel propagation parameters corresponding to a distinct propagation path.

In another aspect, the invention is a method for mitigating effects of multipath propagation on a received signal comprising one or more components corresponding to possibly distinct propagation paths taken by a transmitted signal, the method comprising the step of: a) computing a cross-ambiguity function of a signal known to be transmitted and received signals to determine parameters of at least one propagation paths; b) obtaining received signals partially compensated for the multipath propagation, by a process which comprises one or more of the following steps performed in an arbitrary order: frequency-shifting a received signal by a predetermined frequency associated with its corresponding propagation path to generate a Doppler-corrected version thereof; time-shifting the received signal by a predetermined delay associated with its corresponding propagation path to generate a time-aligned version thereof; phase-correcting the received signal by a predetermined phase associated with its corresponding propagation path to generate a phase-aligned version thereof; and computing a weighted combination of the partially compensated signals to obtain a reconstructed version of the transmitted signal.

In yet another aspect, the invention is a receiver for use in wireless mobile communication systems, comprising: a) means for receiving signals corresponding to a signal known to be transmitted, the received signals traveling via one or more propagation paths; b) means for computing a cross-ambiguity function of the received signals and the known transmitted signal; c) means for estimating at least one propagation parameter of a propagation path from the computed cross-ambiguity function; and d) means for reconstructing the transmitted signals in accordance with the one or more estimated propagation parameter.

In yet another aspect, the invention is a receiver for use in wireless mobile communications, comprising: a) a channel estimator providing estimates of multipath propagation parameters of the transmitted signal(s) using a signal known to be transmitted; b) a channel reconstructor providing a reconstructed signal, in which the effects of multipath propagation on the received signal are compensated by one or more of: amplitude-scaling, phase-correcting, time- and frequency-shifting of the received signal; and c) correlation detector extracting transmitted information based on the output of the channel reconstructor.

BRIEF DESCRIPTION OF THE DRAWINGS

Understanding of the present invention will be facilitated by consideration of the following detailed description of the preferred embodiments, taken in conjunctin with the accompanying illustrative drawings, in which:

FIG. 2A illustrates short segments of the inphase and the quadrature components of the transmitted noise-free pilot signal; FIG. 2B illustrates the corresponding inphase and quadrature components of the received signal.

FIG. 3A illustrates short segments of the inphase and the quadrature components of the transmitted noise-free pilot signal; FIG. 3B illustrates the corresponding inphase and quadrature components of the received signal.

FIG. 17 is an algorithm for the fast computation of the cross-ambiguity function over an arbitrary line segment.

DETAILED DESCRIPTION OF THE PREFERRED EMBODIMENTS

Figure 6:
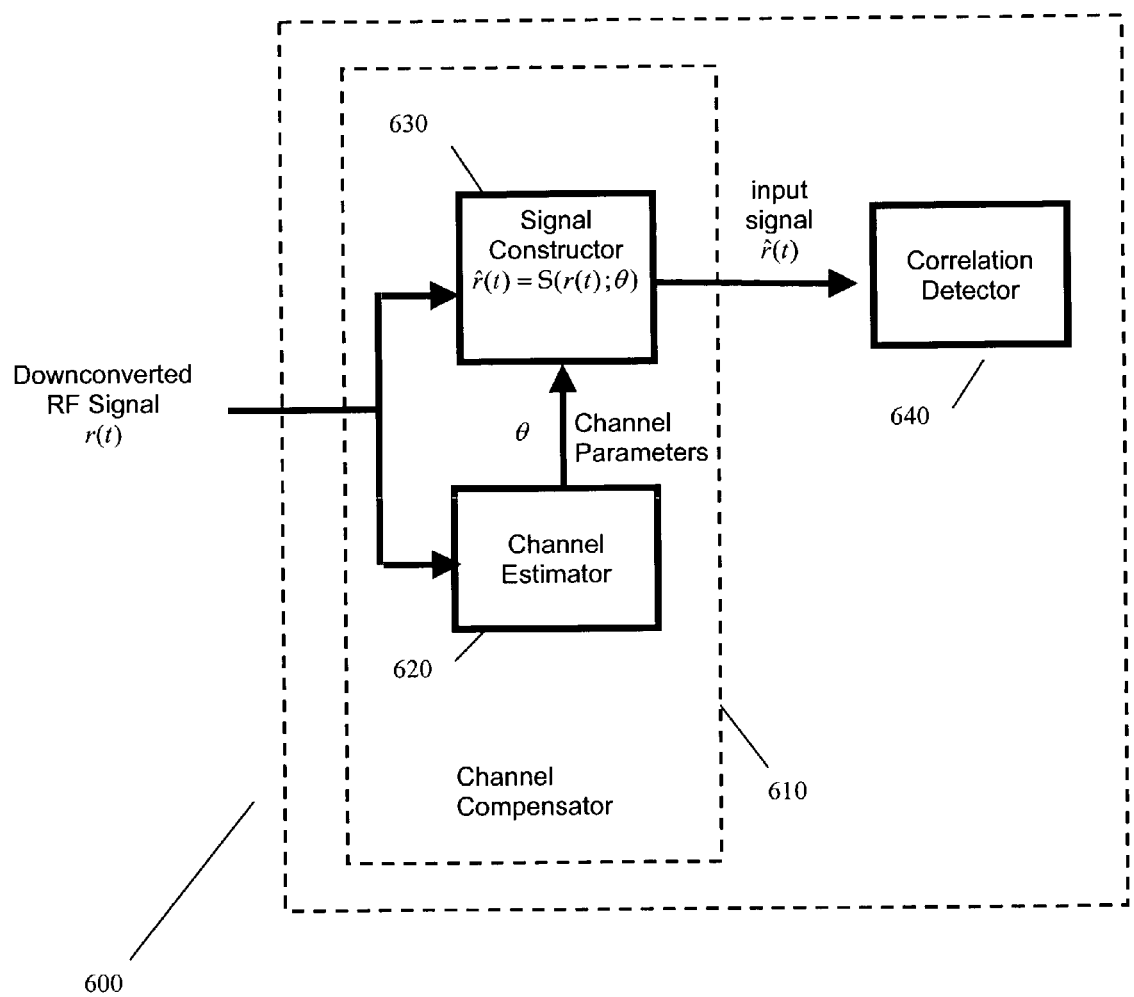
FIG. 6 is a block diagram illustrating a CDMA receiver structure for a mobile unit in accordance with a preferred embodiment of the present invention.

In a significant aspect, the present invention is a novel system and method for improving the performance of CDMA communication systems. With reference to FIG. 6, a novel receiver structure 600 in accordance with the invention comprises a channel compensator 610 and a correlator detector 640. In a preferred embodiment, channel compensator 610 performs two major functions: the estimation of the multipath channel parameters, and the construction of a compensated signal. Correlator detector 640 processes the output of the channel compensator. Correlator detector 640 in a preferred embodiment is a conventional data processing component, which performs correlation and integration followed by threshold detection. Detailed information about such detectors can be found in a number of references, such as for example, John G. Proakis, *Digital Communications*, McGraw-Hill, NY, 1995 [15], which is incorporated herein by reference. The simplified receiver structure of the present invention, illustrated in a preferred embodiment in FIG. 6, effectively mitigates mutipath propagation effects on the transmitted signal for mobile users, reduces the cost, and improves the reliability of CDMA systems.

With reference to FIG. 6, in a preferred embodiment channel compensator 610 comprises a channel estimator 620 and a signal constructor 630. In accordance with the invention, the received down-converted pilot signal r(t) is initially processed by channel estimator 620 to generate estimates of multipath prapagation prameters, such as time-delay, Doppler shift, phase and magnitude. These propagation parameters are then provided to signal constructor 630, which uses them to compensate the effects of multipath propagation on the received signal by amplitude-scaling, phase-correcting, time- and frequency-shifting of the received signal.

In a preferred embodiment, the multipath propagation parameters are estimated by using the cross-ambiguity function of the received and the transmitted pilot signals. A description of the cross-ambiguity function is provided, for example in P. M. Woodward, *Probability and Information Theory, with Applications to Radar*, New York: Pergamon Press Inc., 1953 [2] and R. E. Blahut, W. Miller and Jr. C.

H. Wilcox, *Radar and Sonar*, Springer-Verlag, vol. 32, 1991 [3]. Details of the computation, as used in this invention, are provided below.

As noted, in a preferred embodiment channel estimator 620 computes a cross-ambiguity function of the transmitted pilot and received signals. Because the pilot signal and the information-carrying signals occupy the same frequency band in CDMA systems, in accordance with the present invention the estimated channel parameters for the pilot signal can be used to define the channel parameters of the information-carrying signal channel as well. In describing the multipath channel estimator 620, for clarity of the presentation the received signal is assumed to be due to the transmitted pilot signal only. In reality, the received signal has other components, including the information-carrying signals. However, because the pilot signal and the information-carrying signals have different Walsh codes, the presence of information-carrying signals only appears as an additional noise. Importantly, applying the system and method of this invention to actually received signals, including information-carrying signals, produces likewise improved results as well.

The multipath-channel estimator 620 in a preferred embodiment uses a computatin of the cross-ambiguity function between the pilot and received signals. For a transmitted pilot signal s(t) and its received and down-converted version $r(t) = r_{RF}(t)e^{-j2\pi f_o t}$, the cross-ambiguity function is defined as:

$$A_{r,s}(\tau, v) = \int r(t+\tau/2)s^*(t-\tau/2)e^{j2\pi vt}dt \quad (3)$$

$$= \sum_{k=1}^{N} C_k e^{-j\pi v_k(\tau+\tau_k)} A_{s,s}(\tau - \tau_k, v - v_k).$$

Figure 1:
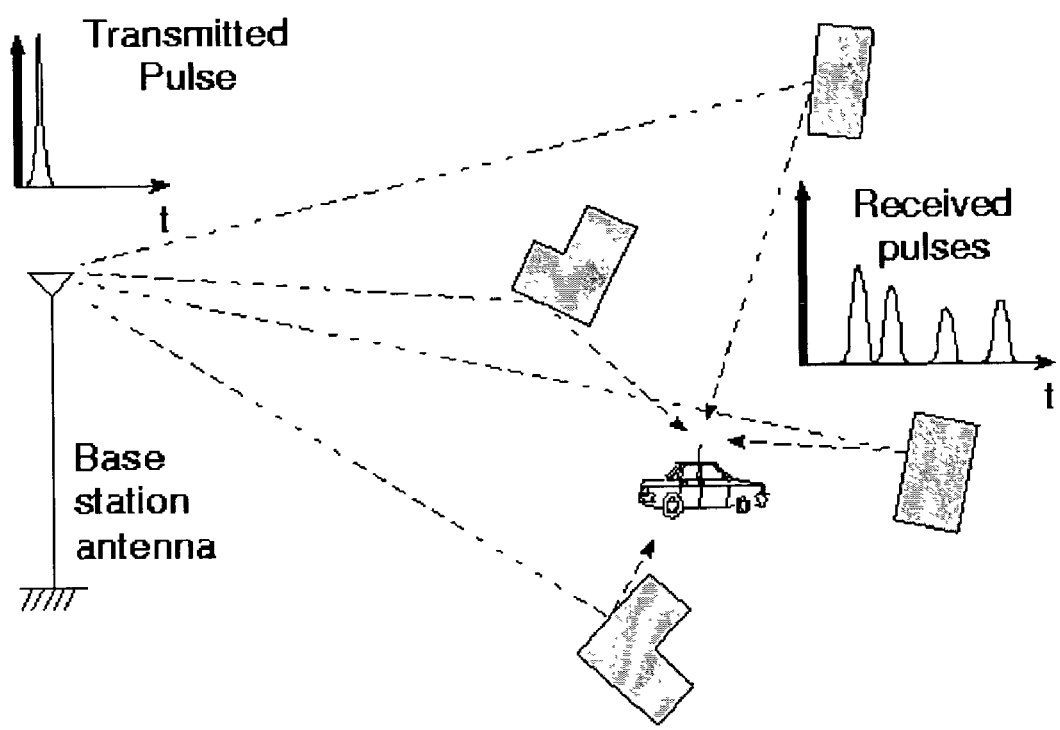
FIG. 1 is an illustration of multipath propagation where the transmitted signal from a base station arrives to a mobile station through alternative paths.
Figure 2:
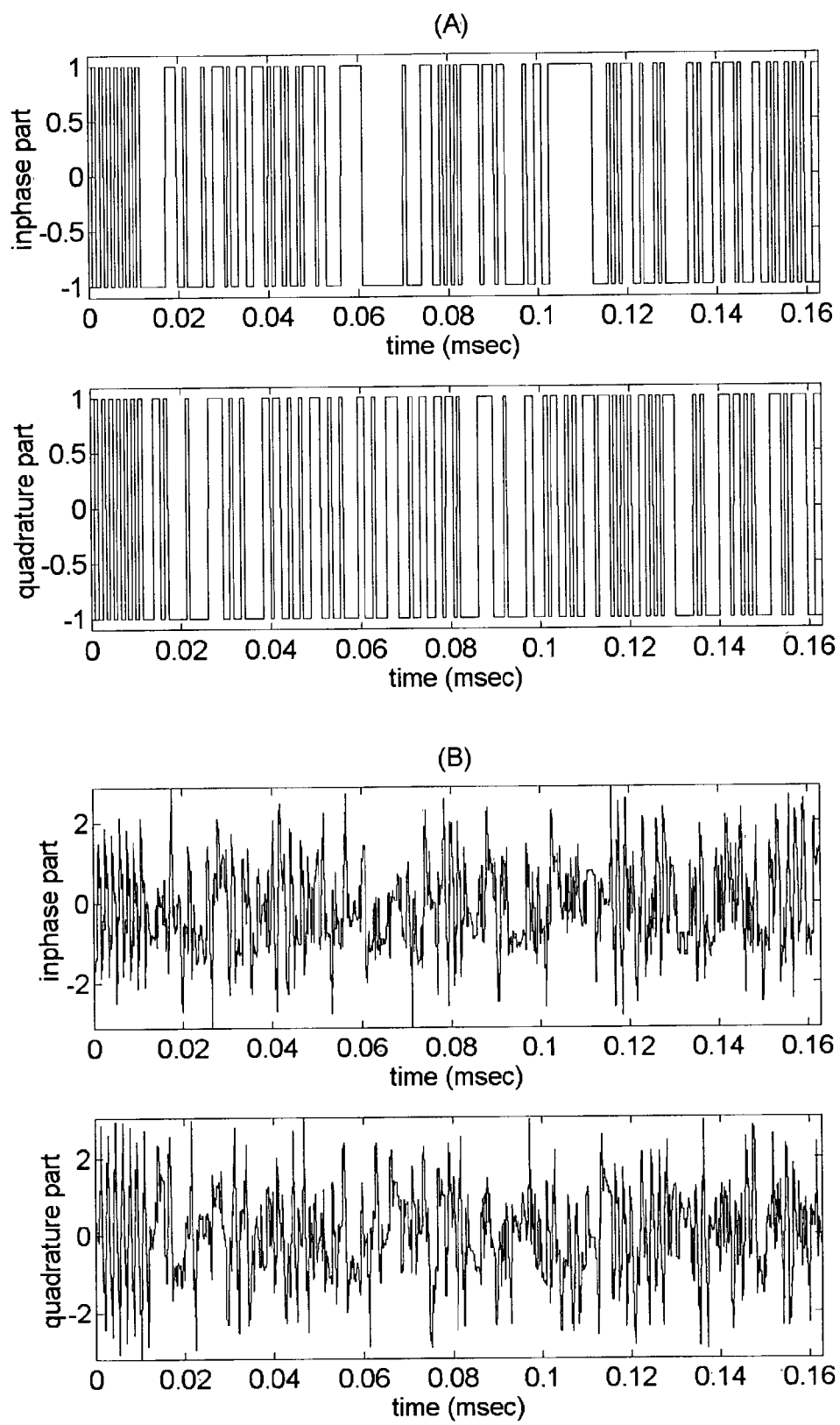
FIGS. 2A and 2B illustrate multipath propagation in a hilly terrain area for the parameters given in Table 1.
Figure 3:
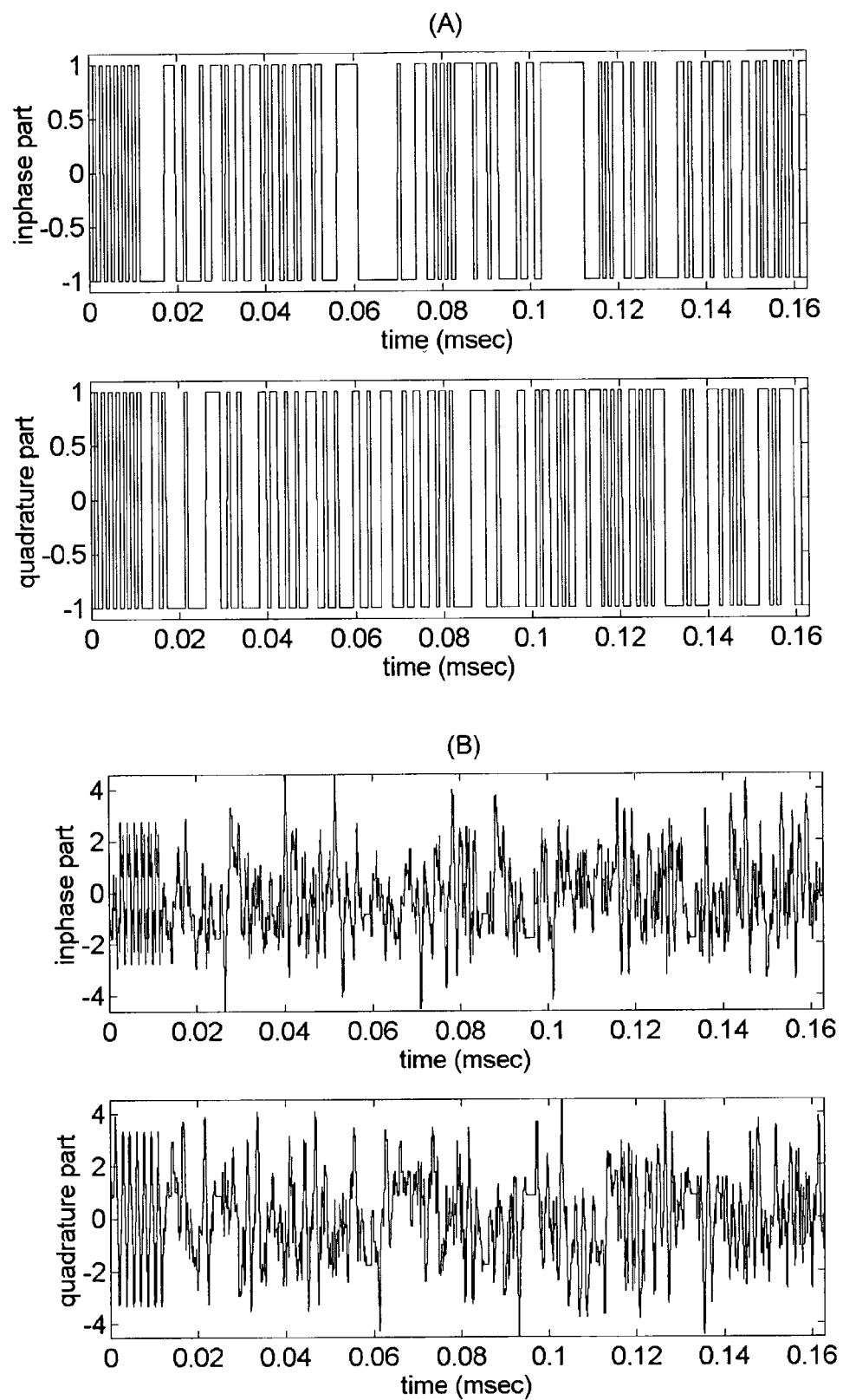
FIGS. 3A and 3B illustrate multipath propagation in an urban area for the parameters given in Table 2.
Figure 4:
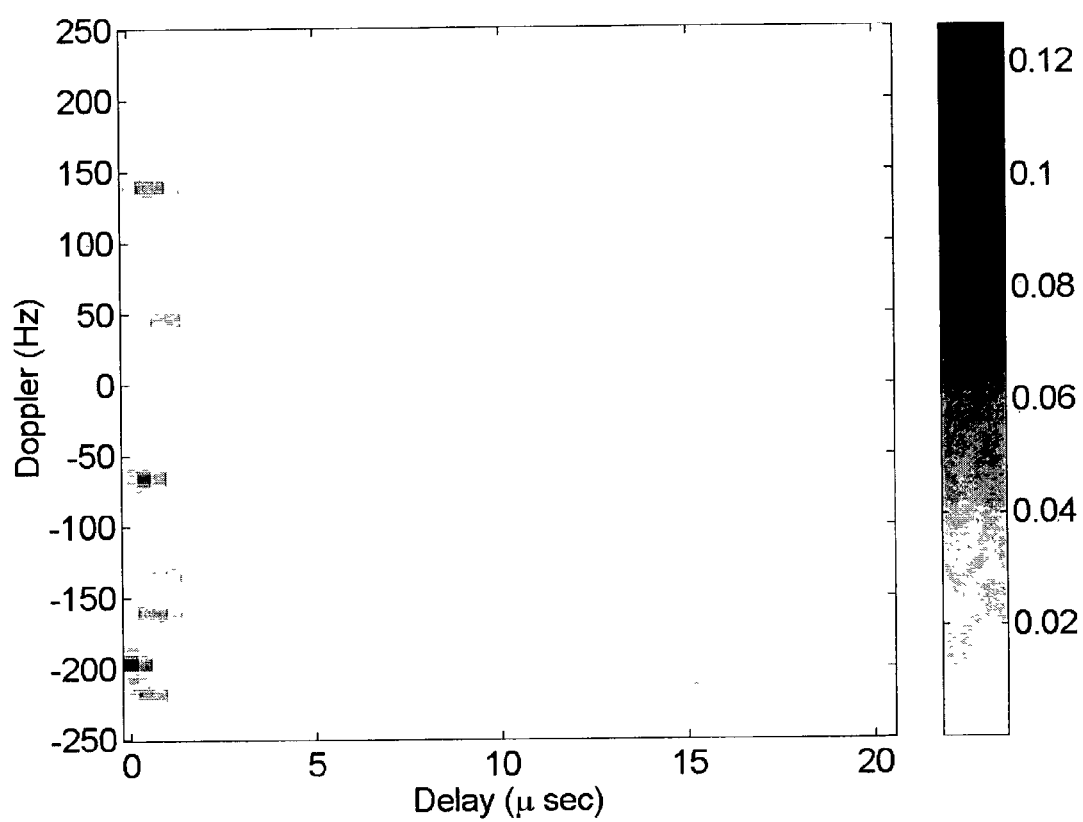
FIG. 4 shows the cross ambiguity function of the received and transmitted pilot signals illustrated in FIGS. 2A,B.
Figure 5:
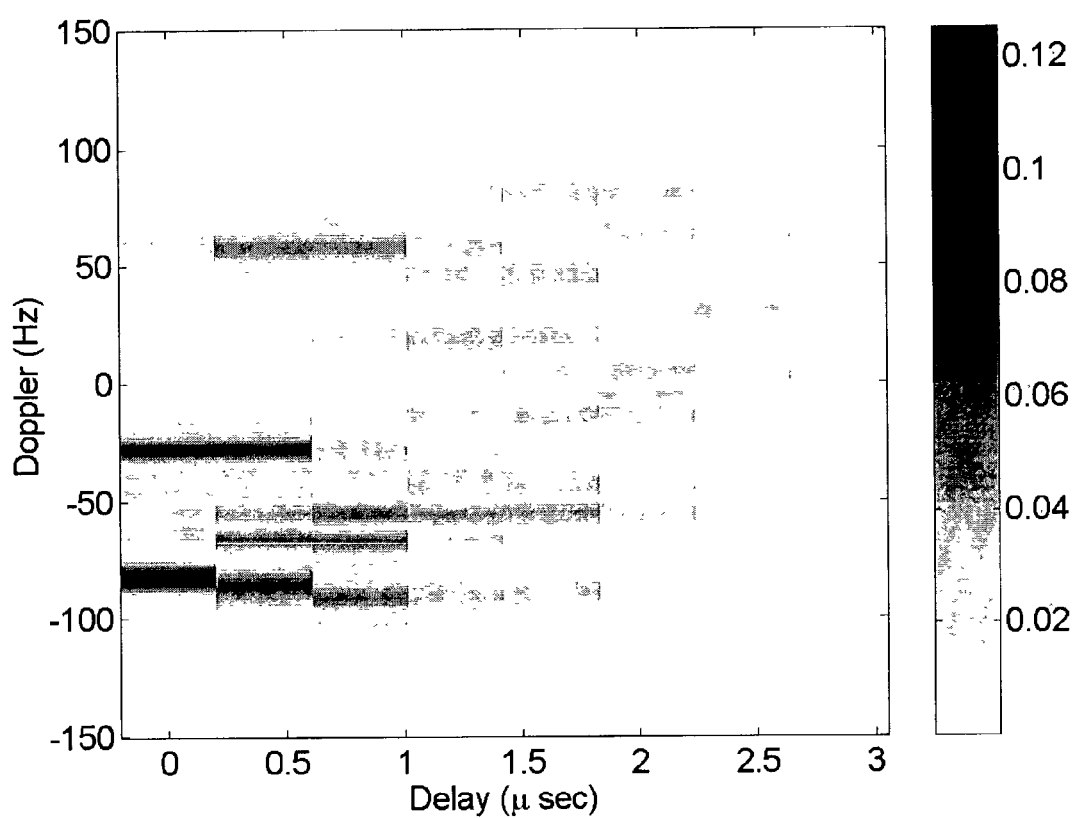
FIG. 5 shows the cross ambiguity function of the received and transmitted pilot signals illustrated in FIGS. 3A,B.

As known, the cross-ambiguity function has local peaks in the vicinity of the delay and the Doppler shift corresponding to each propagation path. The magnitudes of the peaks are related to the received signal strength in that particular path. Since the multipath parameters change dynamically in time, it is apparent that the integration limits should be centered around the time of interest. For practical purposes, because only digitized samples of the received signal are available, a discrete form of the cross-ambiguity function is used. Such a discrete form can be obtained by using the Riemann sum approximation of the integral given by:

$$A_{r,s}(a\delta_\tau, b\delta_v) = \frac{\delta_\tau}{2}\sum_{l} r((a+l)\delta_\tau/2)s^*((a-l)\delta_\tau/2)e^{j\pi bl\delta_v \delta_\tau} \quad (4)$$

$$= \frac{\delta_\tau}{2}\sum_{k=1}^{N} C_k e^{-j\pi v_k(a\delta_\tau + \tau_k)} A_{s,s}(a\delta_\tau - \tau_k, b\delta_v - v_k)$$

where $\delta_\tau/2$ corresponds to the sampling interval on the received pilot signal. FIGS. 4 and 5 illustrate the cross-ambiguity function of the transmitted and received pilot signals of FIGS. 2A,B and 3A,B, respectively. As seen in these figures, signal paths with stronger amplitudes (shown in darker shades) are easily detectable.

In a preferred embodiment, the above equation for the cross-ambiguity function can be used to obtain samples of the cross-ambiguity function over a large grid of delays and Doppler shifts. In accordance with another aspect of the invention, computational saving can be obtained by limiting the range of values for the delay and Doppler shifts to those respective intervals that are likely to be encountered in practice. For instance, in an urban channel model, delays of about a few microseconds and Doppler shifts of less than about 250 Hz are of particular interest.

An efficient method for the computation of the cross-ambiguity function over limited delay and Doppler shift values are provided in the disclosures in A. K. Özdemir and O. Arikan, "Fast computation of the ambiguity function and the Wigner distribution on arbitrary line segments", *IEEE trans. Signal Process.*, vol. 49, pp. 381–393, February 2001 [4] and A. K. Özdemir and O. Arikan, "Efficient computation of the ambiguity function and the Wigner distribution on arbitrary line segments", in *Proc. IEEE Int. Symp. Circuits and Systems*, vol. IV, pp. 171–174, May 1999 [5].

In particular, a simple search algorithm can provide reliable position estimates of the stronger peaks of the cross-ambiguity function. In a preferred embodiment, for a detected peak with a delay of $\tau_k$ and with a Doppler shift of $v_k$, the corresponding path parameters can be estimated using the following expressions:

$$C_k = \frac{A_{r,s}(\tau_k, v_k)e^{j2\pi\tau_k v_k}}{\int |s(t)|^2 dt}$$

$$\alpha_k = |C_k|$$

$$\varphi_k = arg(C_k)$$

It will be appreciated that the accuracy of the obtained parameters can be improved by using denser samples of the received pilot signal. Furthermore, sub-pixel accuracy on the delay and Doppler shifts can be obtained by finding the peak of a low order polynomial surface, which is locally fit to the cross-ambiguity function.

As shown, in accordance with the preferred embodiment the proposed method of obtaining the path parameters of the pilot signal provides estimates to the desired multipath parameters. Naturally, the channel parameters of interest are related to the information-carrying signal. But since the pilot signal and the information-carrying signal occupy the same frequency band in CDMA systems, in accordance with the invention the estimated channel parameters for the pilot signal can be used to describe the information-carrying signal channel as well. In principle, a reliable set of path parameter estimates computed using the pilot signal provides very valuable information that is used to improve the performance of the mobile receiver.

Accordingly, the channel compensator block 610 of the receiver in the preferred embodiment uses a numerically efficient method to utilize the estimated set of propagation parameters to construct a new signal, in which the adverse effects of the multipath propagation are considerably mitigated. The proposed approach results not only in a simplified receiver structure but also in significantly improved reliability of the received information.

In accordance with the presented invention, the channel compensator block of the receiver performs the following general transformation to construct a new signal r̂(t):

$$\hat{r}(t) = S(r(t);\theta)$$

where r(t) corresponds to the received signal and θ corresponds to the estimated channel parameters. In practice, the transformation S should be chosen such that an efficient procedure can be used for its real time computation. In the preferred embodiment of the present invention, the transformation is chosen to provide a weighted combination of partially compensated received signals, as described in detail in the remainder of this section. It will be recognized that other transformations can be used in alternate embodiments.

Figure 7:
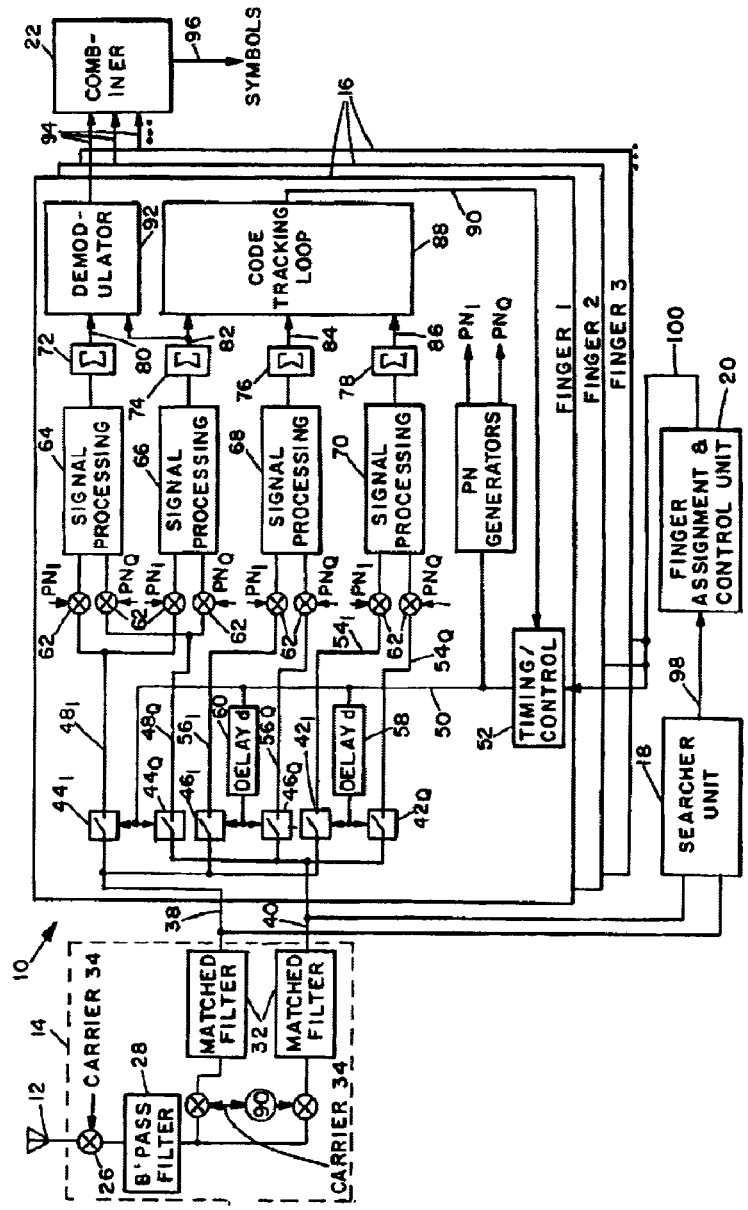
FIG. 7 is a block diagram depicting a prior art conventional mobile CDMA receiver structure.

The structure and operation of both the base and mobile CDMA receiver of the present invention is described next in detail. A conventional mobile CDMA receiver structure is depicted in FIG. 7. As seen therein, the received RF signal is down converted and input to a rake receiver, which includes an independent set of receivers known as fingers. The demodulated output from each finger is combined into a high-quality output signal to capture the energy received from each multipath signal. For details of this receiver the reader is directed to the disclosure of U.S. Pat. No. 6,269,075. As noted above, if the received multipath signal components arrive within the same chip duration with significantly different Doppler shifts, the performance of the rake receiver degrades considerably.

Compare the prior art receiver with the simplified receiver architecture of the present invention illustrated in FIG. 6. As indicated before, the proposed receiver consists of two main processing blocks: the channel compensator and correlator detector. The channel compensator has two main sub-processing blocks: the channel estimator 620 and the signal constructor 630. The output of the channel compensator block is processed by the simplified correlator detector. As detailed below, since the channel compensator effectively combines the strong multipath components into one chip interval, the rest of the receiver can be simplified to a correlator detector. This way, the computationally intensive tasks of path search and phase tracking performed by conventional rake receivers are eliminated.

Figure 8:
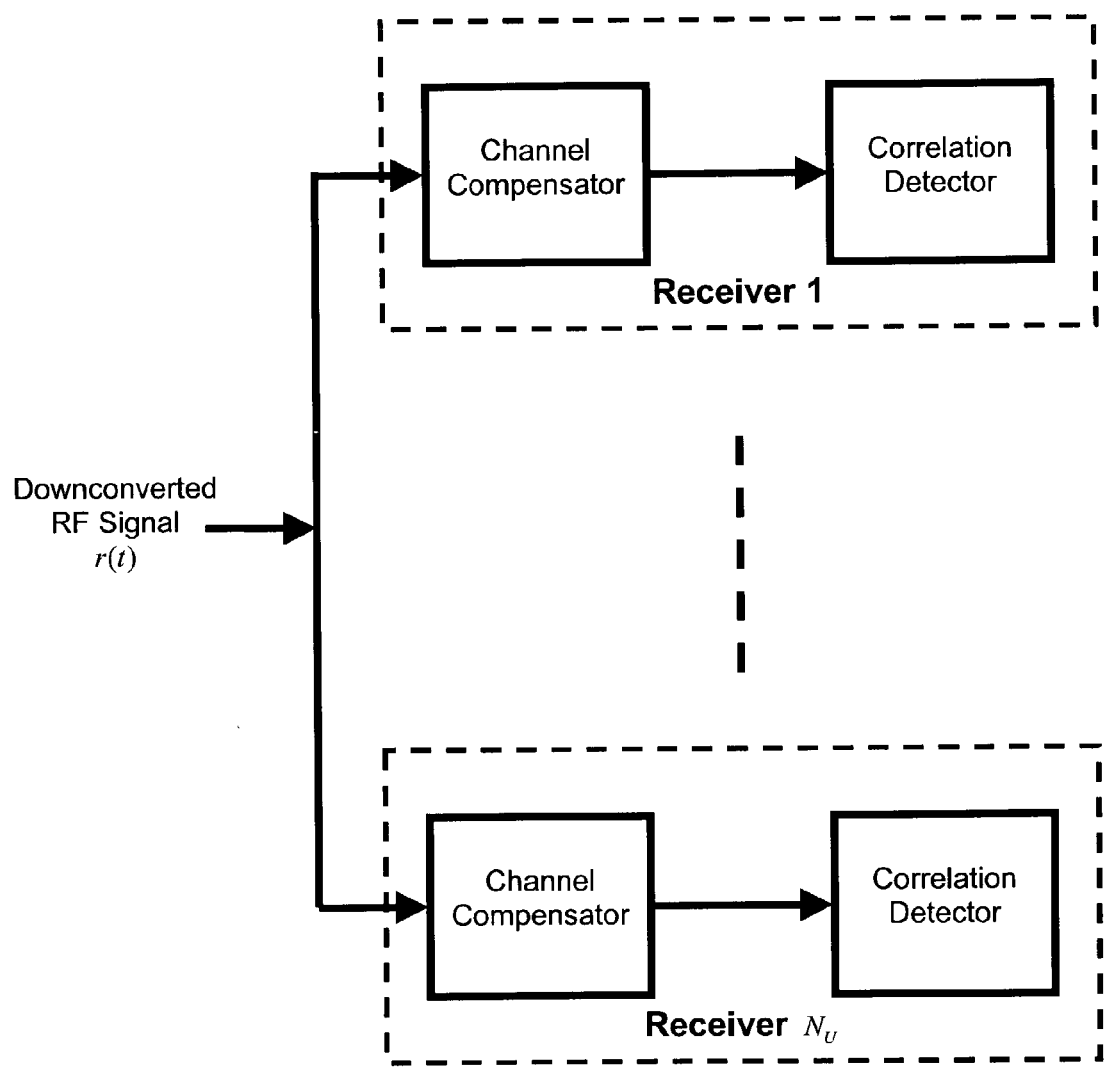
FIG. 8 is a block diagram illustrating a CDMA receiver structure for a base station unit in accordance with a preferred embodiment of the present invention. In one embodiment, for each $N_U$ mobile users served by the base station unit, there is a dedicated receiver whose block diagram is as shown in FIG. 7.

In an important aspect illustrated in FIG. 8, the receiver of the present invention can be configured for use in an existing base station receiver. As shown in FIG. 8, in this embodiment for each mobile user a designated sub-receiver can be used, which consists of a channel compensator and correlator detector blocks. Note that the channel parameter estimates for each mobile user are computed based on the pilot signal of that mobile user. It should be apparent that because the system of this invention does not require any other modifications to the rest of a conventional base or mobile receiver, it can easily and with minimum changes be incorporated into any existing receiver architecture.

The preferred embodiments of the invention will be described below with reference to a CDMA-2000 communication system. For other CDMA based communication systems, such as W-CDMA or HDR, only minor modifications are necessary to adapt the channel estimator to the respective pilot signal structures.

In the preferred implementation of the channel estimator for a CDMA-2000 communication system, the channel estimate is updated in every $T_e$ seconds, which interval is preferably short enough so that the channel does not show considerable variations, and in a preferred embodiment is chosen as the duration of the scrambling long code. Since the cross-ambiguity function of the received signal and the replica of the pilot signal provides a very accurate way of estimating the desired multipath channel parameters, it is used in the preferred embodiment of the channel estimator.

Further, to reduce the complexity of computing cross-ambiguity function at time $kT_e$, windowed versions of the received and pilot signals are preferably used as the input to the channel estimator:

$$r_w(t;kT_e) = r(t)w(t;kT_e)$$

$$s_w(t;kT_e) = s(t)w(t;kT_e) \quad (5)$$

where r(t) is the down-converted received signal, s(t) is the stored replica of the baseband pilot signal, and $w(t;kT_e)$ is the window function.

By computing the cross-ambiguity function of the windowed signals, $r_w(t;kT_e)$ and $s_w(t;kT_e)$, significant computational savings can be obtained. The window function is preferably chosen to be long enough to allow the desired accuracy on the estimated Doppler shifts corresponding to each multipath signal component. Therefore, in a preferred embodiment, the following window function can be used:

$$w(t, kT_e) = \begin{cases} 1, & (k - m/N_{BF})T_e \le t < (k - m/N_{BF})T_e + T_1, 1 \le m \le N_{BF}N_F \\ 0, & \text{otherwise} \end{cases} \quad (6)$$

where $T_1$ determines time intervals in which the window function $w(t,kT_e)$ is non-zero, and $N_{BF}$ and $N_F$ determine the overall duration of the window $w(t,kT_e)$. For example, for a base station receiver of a CDMA-2000 network, these parameters are chosen such that $T_e$ is equal to the scrambling long code duration used in the transmission, $T_1$ is $\frac{1}{128}$ of $T_e$, and $N_{BF}$ is equal to 16 and $N_F$ is equal to 5.

The following definitions may be used to simplify the notations:

$$\tilde{s}_n(t) = \begin{cases} s(t + nT_e/N_{BF}), & 0 \le t < T_1 \\ 0, & \text{otherwise} \end{cases} \quad (7)$$

$$\tilde{r}_n(t) = \begin{cases} r(t + nT_e/N_{BF}), & 0 \le t < T_1 \\ 0, & \text{otherwise} \end{cases}$$

Using the above definitions, the windowed signals in equation (5) can be expressed as follows:

$$s_w(t, kT_e) = \sum_{m=1}^{N_{BF}N_F} \tilde{s}_{(kN_{BF}-m)}(t - (k - m/N_{BF})T_e) \quad (8)$$

$$r_w(t, kT_e) = \sum_{m=1}^{N_{BF}N_F} \tilde{r}_{(kN_{BF}-m)}(t - (k - m/N_{BF})T_e).$$

Then, the cross-ambiguity function of the windowed signals, $r_w(t,kT_e)$ and $s_w(t,kT_e)$ can be expressed in terms of the cross-ambiguity function of the $\tilde{r}_m(t)$ and $\tilde{s}_m(t)$ as follows:

$$A_{w_w,s_w}(\tau, v, kT_e) = \int r_w(t+\tau/2; kT_e)s_w^*(t-\tau/2; kT_e)e^{j2\pi vt}dt \quad (9)$$

$$= \int \sum_{p=1}^{N_{BF}N_F} \tilde{r}_{(kN_{BF}-p)}(t-(k-p/N_{BF})T_e +$$

$$\tau/2)\sum_{q=1}^{N_F}\tilde{s}^*_{(kN_{BF},q)}(t-(k-q/N_{BF})T_e - \tau/2)e^{j2\pi vt}dt$$

$$= \sum_{p=1}^{N_{BF}N_F}\sum_{q=1}^{N_{BF}N_F} A_{\tilde{r}_{(kN_{BF}-p)},\tilde{s}_{(kN_{BF}-q)}}(\tau +$$

$$(p-q)T_e/N_{BF}, v)e^{j\pi v(2k-(p+q)/N_{BF})T_e}$$

The above decomposition of the cross-ambiguity function $A_{r_w,s_w}(\tau,v;kT_e)$ into simpler-to-compute cross-ambiguity functions $A_{\tilde{r}_k,\tilde{s}_k}(\tau,v)$ provides significant computational savings in the preferred implementation of the channel estimator.

In one aspect of the invention, further computational savings may be obtained by limiting the number of time-delays $\tau$ for which $A_{r_w,s_w}(\tau,v;kT_e)$ is computed. In particular, the cross-ambiguity function can be computed for the time-delays bounded by the time interval between the earliest and the latest multipath signals. For an urban communication environment, the search range for $\tau$ is about 2 microseconds, which is smaller than the above-described value of $T_1$ for the window function. Thus, designating the search range for $\tau$ with $T_M$, the above decomposition for the $A_{r_w,s_w}(\tau,v;kT_e)$ is further simplified to contain only the p=q terms:

$$A_{r_w,s_w}(\tau, v; kT_e) = \sum_{p=1}^{N_{BF}N_F} A_{\tilde{r}_{(kN_{BF}-p)},\tilde{s}_{(kN_{BF}-p)}}(\tau, v)e^{j2\pi v(k-p/N_{BF})T_e}, \quad (10)$$

$$0 \le \tau \le T_M$$

where $T_M$ corresponds to the duration of the search interval for the multipath delays. By changing the index of summation from p to $(k-r)N_{BF}+s$, $k-N_F+1 \le r \le k$, $1 \le s \le N_{BF}$, the following expression is obtained for the cross-ambiguity function $$A_{r_w,s_w}(\tau, v; kT_e) = \sum_{r=k-N_F+1}^{k}\sum_{s=1}^{N_{BF}} A_{\tilde{r}_{(rN_{BF}-s)},\tilde{s}_{(rN_{BF}-s)}}(\tau, v)e^{j2\pi v(r-s/N_{BF})T_e}, 0 \le \tau \le T_M \quad (11)$$

which can be rewritten as:

$$A_{r_w,s_w}(\tau, v; kT_e) = \sum_{r=k-N_F+1}^{k} \tilde{A}_{\tilde{r}_{(r)},\tilde{s}_{(r)}}(\tau, v)e^{j2\pi vrT_e}, 0 \le \tau \le T_M \quad (12)$$

where $\tilde{A}_{\tilde{r}_{(r)},\tilde{s}_{(r)}}(\tau,v)$ is given by the inner summation in equation (11):

$$\tilde{A}_{\tilde{r}_{(r)},\tilde{s}_{(r)}} = \sum_{s=1}^{N_{BF}} \tilde{A}_{\tilde{r}_{(rN_{BF}-s)},\tilde{s}_{(rN_{BF}-s)}}(\tau, v)e^{-j2\pi v(s/N_{BF})T_e}, 0 \le \tau \le T_M \quad (13)$$

In another aspect of the invention, further computational savings are obtained by limiting the range of potential Doppler shifts. For instance, in a CDMA system with a carrier frequency of about 2 GHz and mobile user speed of 120 km/h, the range of Doppler shifts is limited to about ±200 Hz. By representing the search range for $v$ as $v_M$, and discretizing the search interval of $\tau$ with $\delta_\tau$ and the search range of $v$ with $\delta_v$, the required computation of the $A_{r_w,s_w}(\tau,v;kT_e)$ can be expressed as:

$$A_{r_w,s_w}(a\delta_\tau, b\delta_v; kT_e) = \quad (14)$$

$$\sum_{r=k+1-N_F}^{k} \tilde{A}_{\tilde{r}_{(r)},\tilde{s}_{(r)}}(a\delta_\tau, b\delta_v)e^{j2\pi b\delta_v rT_e} \text{ for } 0 \le a \le a_M, -b_M \le b \le b_M$$

where $a_M$ and $b_M$ limit the search index range for the delay and Doppler shifts respectively.

This final form requires the computation of $\tilde{A}_{\tilde{r}_{(r)},\tilde{s}_{(s)}}(\tau,v)$ over a uniformly spaced grid in the $\tau$–$v$ coordinate system. The interested reader is directed to the disclosure in [4] and [5], which are incorporated herein for background. For completeness of the presentation of the preferred embodiment, the efficient computational method preferably used in computation of the required cross-ambiguity samples is shown in FIG. 17. Additional information is provided in the following "Mathematical Background" section.

In yet another aspect, further computational saving can be obtained by using a time-recursive computation of the required cross-ambiguity function samples. For this purpose, a decomposition of $A_{r_w,s_w}(a\delta_\tau, b\delta_v;(k+1)T_e)$ into $\tilde{A}_{\tilde{r}_{(r)},\tilde{s}_{(r)}}(a\delta_\tau, b\delta_v)$ is used to derive an efficient update relationship:

$$A_{r_w,s_w}(a\delta_\tau, b\delta_v; k+1)T_e) = \quad (15)$$

$$\sum_{r=k+2-N_F}^{k+1} \tilde{A}_{\tilde{r}_{(r)},\tilde{s}_{(r)}}(a\delta_\tau, b\delta_v)e^{j2\pi b\delta_v rT_e} \text{ for } 0 \le a \le a_M, -b_M \le b \le b_M$$

By using Eq. (14), the following desired recursive form is obtained:

$$A_{r_w,s_w}(a\delta_\tau, b\delta_v;(k+1)T_e) = \tilde{A}_{\tilde{r}_{(k+1)},\tilde{s}_{(k+1)}}(a\delta_\tau, b\delta_v)e^{j2\pi b\delta_v(k+1)T_e}$$

$$+ A_{r_w,s_w}(a\delta_\tau, b\delta_v; kT_e)$$

$$- \tilde{A}_{\tilde{r}_{(k+1-N_F)},\tilde{s}_{(k+1-N_F)}}(a\delta_\tau, b\delta_v)e^{j2\pi b\delta_v(k+1-N_F)T_e} \text{ for}$$
$$0 \le a \le a_M, -b_M \le b \le b_M \quad (16)$$

This recursive relationship can be used to update the previously computed cross-ambiguity function.

The recursion is preferably started by computing $A_{r_w,s_w}(a\delta_\tau, b\delta_\tau; N_F T_e)$ using Eq. (14). Once the samples of $A_{r_w,s_w}(\tau,v;kT_e)$ are computed on the desired search grid, the search for the peak locations corresponding to different multipath components can be started. In this search, the location of the previously found peaks can be used to decrease the search time. The required search can be either conducted by using 1-dimensional or 2-dimensional search strategies.

In the simpler 1-dimensional approach used in one embodiment of the invention, $A_{r_w,s_w}(a\delta_\tau,b\delta_v;kT_e)$ is first computed over a coarse grid with a large $\delta_\tau$ value. On this coarse grid, those peaks with significant magnitude are found by a simple 2-Dimensional search. Assuming that the obtained number of significant peaks is $\hat{N}$ and they have Doppler shifts of $b_i\delta_v$ for $1 \leq i \leq \hat{N}$, for each i, $A_{r_w,s_w}(a\delta_\tau,b_i\delta_v;kT_e)$ may be computed on a denser line-segment with a smaller $\delta_\tau$. An efficient method of this computation is illustrated in FIG. 17 and described in detail in [4] and [5], and is also illustrated in the Mathematical Background section of disclosure. Then, 1-dimensional search along the computed denser line segments is preferably conducted to obtain the time location of the peaks of $A_{r_w,s_w}(a\hat{\delta}_\tau,b_i\delta_v;kT_e)$.

Furthermore, if sub-pixel accuracy in the obtained peak locations is desired, as detailed, for example in I. D. Faux and M. J. Pratt, *Computational Geometry for Design and Manufacture*, Ellis Horwood 1979 [9], J. D. Foley, A. VanDam, S. K. Feiner, J. F. Hughes and R. L. Phillips. *Introduction to Computer Graphics*, Addison Wesley 1994 [10] and D. F. Rogers and J. A. Adams, *Mathematical Elements for Computer Graphics*, 2nd edition, McGraw Hill 1989 [11], a quadratic function may be fitted to the amplitude of the cross-ambiguity function samples in the vicinity of the obtained peak locations. This quadratic fit is expected to improve the accuracy of the obtained delay and Doppler shift estimates of the individual multipath signal components further. The details of such fitting are within the level of skill in the art and will not be discussed in detail herein.

In a preferred embodiment, in the neighbourhood of time $k*T_e$, for a detected path with delay $\hat{\tau}_{q,k}$ and the Doppler shift $\hat{v}_{q,k}$, the corresponding amplitude and phase parameters can be computed using the following set of equations:

$$\hat{C}_{q,k} = \frac{A_{r_w,s_w}(\hat{\tau}_{q,k}, \hat{v}_{q,k}; kT_e) e^{j2\pi\hat{\tau}_{q,k}\hat{v}_{q,k}}}{\int |s_w(t; kT_e)|^2 dt} \quad (17)$$

$$\hat{\alpha}_{q,k} = |\hat{C}_{q,k}|$$

$$\hat{\varphi}_{q,k} = \arg(\hat{C}_{q,k})$$

Figure 9:
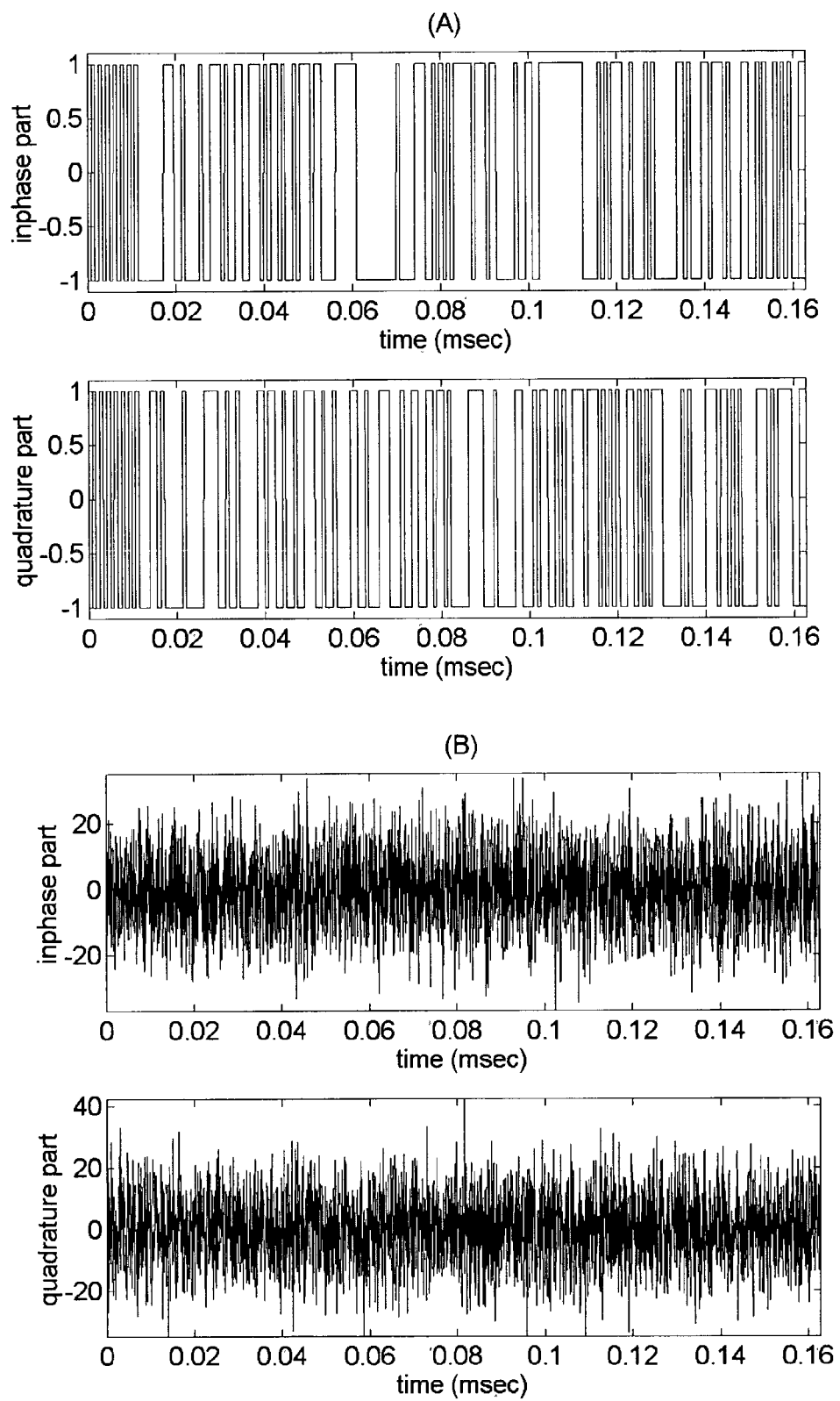
FIGS. 9A and 9B illustrate multipath propagation in an urban area. Short segments of the inphase and quadrature parts of the transmitted and the received pilot signals are shown in FIGS. 9A and 9B, respectively. In this illustration the received signal at 7 dB $E_b/N_o$ level is computed by using the multipath parameters given in Table 2.
Figure 10:
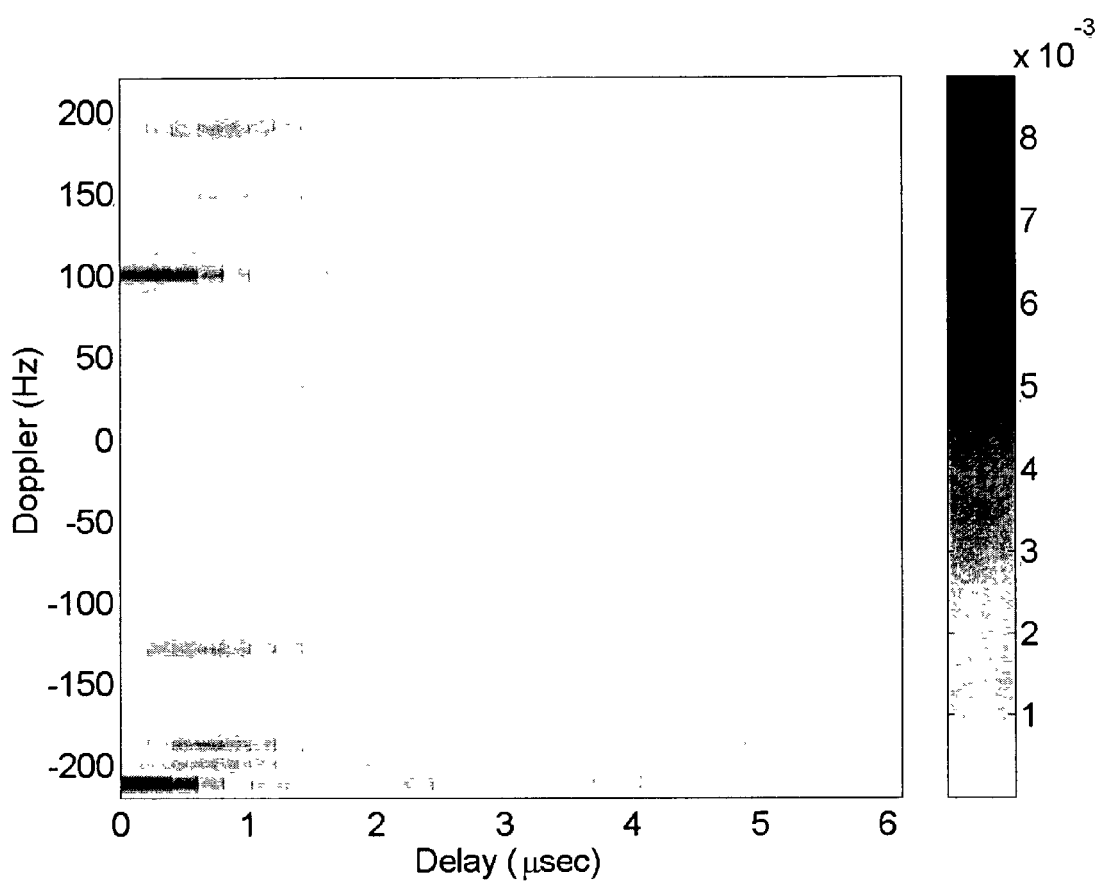
FIG. 10 shows the windowed cross ambiguity function of the received and transmitted pilot signals shown in FIG. 9.

The performance of channel estimator 610 in an urban channel based on the propagation parameters given in Table 2 is evaluated on a transmitted and received pilot signals shown in FIGS. 9A and 9B, respectively. The computed windowed cross-ambiguity function $A_{r_w,s_w}(\tau,v;kT_e)$ of the received pilot signal of FIG. 9B based on the above-described window parameters is shown in FIG. 10. The actual and the estimated propagation parameters at the communication rate of 307.2 Kbps computed by channel estimator 630 are given in Table 3.

TABLE 3

| Path No: q | $\alpha_{q,k}$ | $\hat{\alpha}_{q,k}$ | $\phi_{q,k}$ (radians) | $\hat{\phi}_{q,k}$ (radians) | $v_{q,k}$ (Hz) | $\hat{v}_{q,k}$ (Hz) | $\tau_{q,k}$ (chips) | $\hat{\tau}_{q,k}$ (chips) |
|---|---|---|---|---|---|---|---|---|
| 1 | 0.269 | 0.268 | 2.65 | 2.71 | -210.90 | -210.98 | 0.00 | 0.00 |
| 2 | 0.174 | 0.175 | 5.38 | 5.34 | 100.00 | 100.12 | 0.25 | 0.25 |
| 3 | 0.098 | 0.096 | 3.08 | 2.85 | -128.99 | -128.48 | 0.75 | 0.75 |
| 4 | 0.095 | 0.093 | 5.13 | 5.00 | 188.02 | 188.20 | 0.75 | 0.75 |
| 5 | 0.095 | 0.099 | 2.90 | 2.55 | -187.17 | -186.48 | 0.75 | 0.75 |
| 6 | 0.071 | 0.064 | 2.87 | 3.78 | -199.48 | -201.52 | 0.75 | 1.00 |
| 7 | 0.046 | 0.051 | 2.83 | 2.44 | 147.34 | 148.24 | 1.00 | 1.25 |
| 8 | 0.023 | 0.025 | 2.59 | 2.69 | 51.35 | 51.13 | 1.50 | 1.75 |
| 9 | 0.020 | 0.023 | 5.66 | 5.22 | 31.91 | 32.66 | 1.50 | 1.25 |
| 10 | 0.019 | | 0.04 | | 152.25 | | 1.50 | |
| 11 | 0.018 | | 1.87 | | -200.42 | | 1.75 | |
| 12 | 0.013 | | 0.31 | | -206.80 | | 2.00 | |
| 13 | 0.013 | | 4.36 | | -88.31 | | 2.00 | |
| 14 | 0.010 | | 4.08 | | -165.80 | | 2.00 | |
| 15 | 0.007 | | 6.18 | | -202.68 | | 2.25 | |
| 16 | 0.007 | | 3.47 | | -73.53 | | 2.25 | |
| 17 | 0.006 | | 2.51 | | -97.81 | | 2.25 | |
| 18 | 0.005 | | 1.25 | | -37.84 | | 2.50 | |
| 19 | 0.004 | | 3.93 | | -207.43 | | 2.50 | |
| 20 | 0.004 | | 4.61 | | 82.21 | | 2.75 | |

Figure 12:
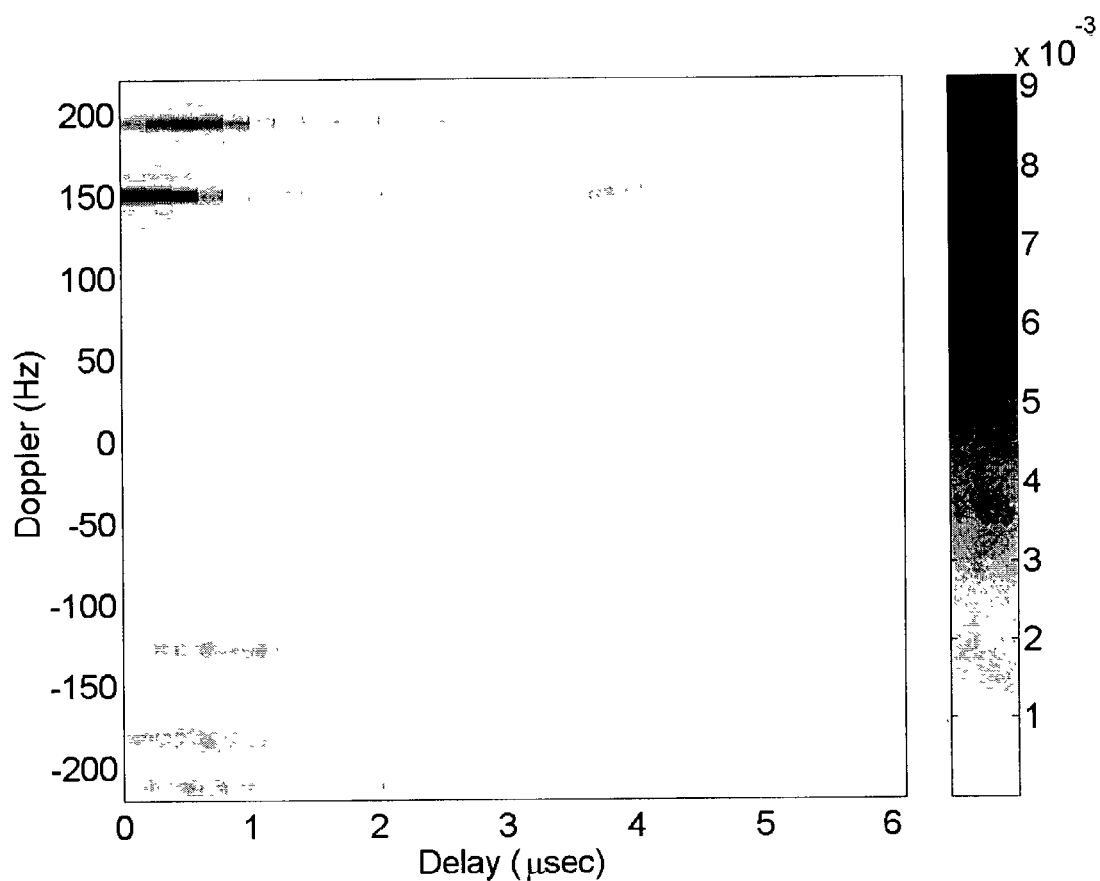
FIG. 12 shows the windowed cross ambiguity function of the received and transmitted pilot signals after an abrupt change in the channel environment shown in FIGS. 9A, B. Note that the Doppler shifts of the individual paths have changed considerably after the abrupt change in the channel.

In this table, the estimated path parameters are denoted with a "^" over their respective symbol. As seen from the obtained results, the channel estimator provides reliable and accurate estimates of the strongest 9 of the 20 existing paths in the synthetic urban channel model. FIG. 12 shows the windowed cross ambiguity function of the received and transmitted pilot channel signals after an abrupt change in the channel environment shown in FIGS. 9A, B. Note that the Doppler shifts of the individual paths have changed considerably after the abrupt change in the channel.

The estimated multipath channel parameters by the channel estimator 620 are made available in a preferred embodiment to the signal constructor 630 every $T_e$ seconds. In the preferred embodiment, signal constructor 630 utilizes these parameters to construct a channel-compensated signal. This signal is supplied to correlator detector 640, which provides reliable detection of the information symbols. In the construction of the channel-compensated signal the purpose is to obtain Doppler-corrected, phase-and time-aligned multipath components.

There are many alternative methods in the construction of the compensated signal that can be used in accordance with the present invention. Because of its simplicity and robustness, in the preferred embodiment, signal constructor 630 utilizes the following method:

$$\hat{r}(t) = \sum_{q=1}^{\hat{N}_k} \frac{|\hat{\alpha}_{q,k}|}{\hat{\alpha}_k} e^{-j(\hat{\varphi}_{q,k} + 2\pi\hat{v}_{q,k}(t+\hat{\tau}_{q,k}))} r(t+\hat{\tau}_{q,k}), \quad kT_e < t \leq (k+1)T_e \quad (18)$$

where $\hat{N}_k$ is the number of significant paths that are detected by the channel estimator, $\hat{\alpha}_{q,k}$, $\hat{\phi}_{q,k}$ are the estimated channel parameters described before, the $\hat{\tau}_{q,k}$'s are the appropriate delay values determined by the channel estimator based on the estimated delays of each multipath signal, and scaling parameter given by $$\hat{\alpha}_k = \sqrt{\sum_{q=1}^{\hat{N}_k} |\hat{\alpha}_{k,q}|^2}.$$

Channel constructor 630 preferably provides a mutipath channel compensated information-carrying signal to correlator detector 640. In different embodiments, channel estimator 620 or channel constructor 630 may be configured to compute weighted time averages of the most recent and previously computed set of propagation parameters to be provided to correlator detector 640 to improve its performance in a slowly varying channel.

EXAMPLES

In the remainder of the disclosure the performance of a mobile receiver 600 in accordance with the present invention has been evaluated via simulations of a CDMA-2000 system in various urban environments by using the Advanced Design System of Agilent Technologies. The simulations were conducted for both the uplink and downlink transmissions. For the uplink transmissions, the communication rates were 307.2 Kbps and 153.6 Kbps. For the downlink transmissions, the communication rate was 307.2 Kbps. Furthermore, for both the uplink and the downlink cases, simulations were conducted to investigate the effect of abrupt change in the communication channel. The obtained bit error rates corresponding to CDMA receiver 600 and to the conventional rake receiver are given in FIGS. 11, 13, 14 and 15. Also, to illustrate the accuracy of the channel estimation conducted by the receiver of this invention, the actual channel parameters used in the simulations and their obtained estimates are given in Tables 4–6 below.

TABLE 4

| Path No: q | $\alpha_{q,k}$ | $\hat{\alpha}_{q,k}$ | $\phi_{q,k}$ (radians) | $\hat{\phi}_{q,k}$ (radians) | $v_{q,k}$ (Hz) | $\hat{v}_{q,k}$ (Hz) | $\tau_{q,k}$ (chips) | $\hat{\tau}_{q,k}$ (chips) |
|---|---|---|---|---|---|---|---|---|
| \multicolumn{9}{c}{Prior to Abrupt Change of Channel Parameters} |
| 1 | 0.269 | 0.271 | 4.21 | 4.19 | −210.90 | −210.98 | 0.00 | 0.00 |
| 2 | 0.174 | 0.171 | 1.26 | 1.38 | 100.00 | 99.69 | 0.25 | 0.25 |
| 3 | 0.098 | 0.105 | 1.72 | 1.84 | −128.99 | −129.34 | 0.75 | 0.75 |
| 4 | 0.095 | 0.094 | 3.93 | 3.97 | 188.02 | 188.20 | 0.75 | 0.75 |
| 5 | 0.095 | 0.108 | 3.37 | 3.45 | −187.17 | −186.91 | 0.75 | 0.75 |
| 6 | 0.071 | 0.075 | 0.37 | 0.20 | −199.48 | −199.80 | 0.75 | 1.00 |
| 7 | 0.046 | 0.046 | 0.56 | 0.26 | 147.34 | 147.81 | 1.00 | 1.00 |
| 8 | 0.023 | 0.024 | 1.70 | 1.50 | 51.35 | 52.42 | 1.50 | 1.50 |
| 9 | 0.020 | | 2.57 | | 31.91 | | 1.50 | |
| 10 | 0.019 | | 2.98 | | 152.25 | | 1.50 | |
| 11 | 0.018 | | 5.71 | | −200.42 | | 1.75 | |
| 12 | 0.013 | | 3.75 | | −206.80 | | 2.00 | |
| 14 | 0.010 | | 3.00 | | −165.80 | | 2.00 | |
| 15 | 0.007 | | 3.75 | | −202.68 | | 2.25 | |
| 16 | 0.007 | | 1.01 | | −73.53 | | 2.25 | |
| 17 | 0.006 | | 5.21 | | −97.81 | | 2.25 | |
| 18 | 0.005 | | 6.01 | | −37.84 | | 2.50 | |
| 19 | 0.004 | | 3.74 | | −207.43 | | 2.50 | |
| 20 | 0.004 | | 0.18 | | 82.21 | | 2.75 | |
| \multicolumn{9}{c}{After the Abrupt Change of Channel Parameters} |
| 1 | 0.275 | 0.279 | 3.03 | 2.99 | 150.00 | 149.96 | 0.00 | 0.00 |
| 2 | 0.188 | 0.181 | 5.10 | 2.31 | 193.84 | 193.79 | 0.50 | 0.50 |
| 3 | 0.098 | 0.092 | 1.72 | 0.37 | −128.99 | −128.48 | 0.75 | 0.75 |
| 4 | 0.091 | 0.149 | 2.06 | 4.80 | −183.17 | −184.77 | 0.50 | 0.50 |
| 5 | 0.095 | | 3.37 | | −187.17 | | 0.75 | |
| 6 | 0.081 | 0.081 | 0.95 | 2.96 | −210.09 | −210.55 | 0.50 | 0.50 |
| 7 | 0.046 | 0.049 | 0.56 | 3.52 | 147.34 | 146.52 | 1.00 | 1.00 |
| 8 | 0.021 | | 4.37 | | −192.61 | | 1.25 | |
| 9 | 0.020 | 0.025 | 2.57 | 1.18 | 31.78 | 30.51 | 1.50 | 1.50 |
| 10 | 0.019 | 0.020 | 5.34 | 5.57 | −185.10 | −186.91 | 1.75 | 1.50 |
| 11 | 0.018 | | 5.71 | | 13.74 | | 2.00 | |
| 12 | 0.013 | | 3.75 | | −207.39 | | 1.75 | |
| 13 | 0.013 | | 2.07 | | −134.02 | | 1.75 | |
| 14 | 0.010 | | 3.00 | | 53.69 | | 2.00 | |
| 15 | 0.007 | | 3.75 | | −153.71 | | 2.25 | |
| 16 | 0.007 | | 1.01 | | 43.88 | | 2.25 | |
| 17 | 0.006 | | 5.21 | | −88.86 | | 1.75 | |
| 18 | 0.005 | | 6.01 | | −204.81 | | 2.25 | |
| 19 | 0.004 | | 3.74 | | −192.21 | | 2.00 | |
| 20 | 0.004 | | 0.18 | | 57.89 | | 2.75 | |

Table 4 illustrates the actual and the estimated multipath channel parameters for an urban uplink communication channel which exhibits an abrupt change in its multipath structure. The communication rate is 307.2 Kbps. In the table, results are given both before and after an abrupt change in the channel. Although there are 20 multipath components, the parameters of only the 8 strongest of them are estimated. The estimated path parameters are denoted with a "^" over their respective symbol.

TABLE 5

| Path No: q | $\alpha_{q,k}$ | $\hat{\alpha}_{q,k}$ | $\phi_{q,k}$ (radians) | $\hat{\phi}_{q,k}$ (radians) | $v_{q,k}$ (Hz) | $\hat{v}_{q,k}$ (Hz) | $\tau_{q,k}$ (chips) | $\hat{\tau}_{q,k}$ (chips) |
|---|---|---|---|---|---|---|---|---|
| 1 | 0.269 | 0.269 | 1.46 | 1.33 | −210.90 | −210.55 | 0.00 | 0.00 |
| 2 | 0.174 | 0.173 | 1.50 | 1.43 | 100.00 | 100.12 | 0.25 | 0.25 |
| 3 | 0.098 | 0.110 | 0.31 | 0.43 | −128.99 | −129.34 | 0.75 | 0.75 |
| 4 | 0.095 | 0.112 | 0.49 | 0.54 | 188.02 | 187.77 | 0.75 | 0.75 |
| 5 | 0.095 | 0.084 | 4.03 | 4.18 | −187.17 | −187.34 | 0.75 | 1.00 |
| 6 | 0.071 | 0.084 | 1.20 | 1.01 | −199.48 | −199.80 | 0.75 | 0.75 |
| 7 | 0.046 | 0.037 | 5.30 | 5.49 | 147.34 | 146.95 | 1.00 | 1.00 |
| 8 | 0.023 | 0.036 | 1.09 | 1.04 | 51.35 | 51.56 | 1.50 | 1.50 |
| 9 | 0.020 | | 1.07 | | 31.91 | | 1.50 | |
| 10 | 0.019 | | 6.25 | | 152.25 | | 1.50 | |
| 11 | 0.018 | | 2.76 | | −200.42 | | 1.75 | |
| 12 | 0.013 | | 2.14 | | −206.80 | | 2.00 | |
| 13 | 0.013 | | 1.97 | | −88.31 | | 2.00 | |
| 14 | 0.010 | | 2.29 | | −165.80 | | 2.00 | |
| 15 | 0.007 | | 2.47 | | −202.68 | | 2.25 | |
| 16 | 0.007 | | 3.72 | | −73.53 | | 2.25 | |
| 17 | 0.006 | | 0.75 | | −97.81 | | 2.25 | |
| 18 | 0.005 | | 0.24 | | −37.84 | | 2.50 | |
| 19 | 0.004 | | 2.88 | | −207.43 | | 2.50 | |
| 20 | 0.004 | | 5.47 | | 82.21 | | 2.75 | |

Table 5 illustrates the actual and the estimated multipath channel parameters for an urban uplink communication channel at the communication rate of 153.6 Kbps. The estimated path parameters are denoted with a "^" over their respective symbol.

TABLE 6

| Path No: q | $\alpha_{q,k}$ | $\hat{\alpha}_{q,k}$ | $\phi_{q,k}$ (radians) | $\hat{\phi}_{q,k}$ (radians) | $v_{q,k}$ (Hz) | $\hat{v}_{q,k}$ (Hz) | $\tau_{q,k}$ (chips) | $\hat{\tau}_{q,k}$ (chips) |
|---|---|---|---|---|---|---|---|---|
| Prior to Abrupt Change of Channel Parameters ||||||||| 
| 1 | 0.269 | 0.269 | 3.82 | 3.86 | −210.90 | −210.98 | 0.00 | 0.00 |
| 2 | 0.263 | 0.263 | 0.10 | 0.21 | 100.00 | 99.69 | 0.25 | 0.25 |
| 3 | 0.245 | 0.254 | 0.10 | 0.09 | −128.99 | −128.91 | 0.75 | 0.75 |
| 4 | 0.151 | 0.158 | 1.19 | 1.07 | 188.02 | 188.20 | 0.75 | 0.75 |
| 5 | 0.141 | 0.154 | 3.69 | 3.81 | −187.17 | −187.34 | 0.75 | 0.75 |
| 6 | 0.071 | 0.099 | 0.36 | 0.17 | −199.48 | −199.38 | 0.75 | 1.00 |
| 7 | 0.046 | 0.042 | 2.31 | 2.46 | 147.34 | 146.52 | 1.00 | 1.25 |
| 8 | 0.037 | 0.035 | 3.97 | 3.85 | 51.35 | 51.56 | 1.50 | 1.50 |
| 9 | 0.032 | | 4.51 | | 31.91 | | 1.50 | |
| 10 | 0.032 | | 4.35 | | 152.25 | | 1.50 | |
| 11 | 0.029 | | 0.53 | | −200.42 | | 1.75 | |
| 12 | 0.020 | | 2.85 | | −206.80 | | 2.00 | |
| 13 | 0.020 | | 2.78 | | −88.31 | | 2.00 | |
| 14 | 0.017 | | 2.22 | | −165.80 | | 2.00 | |
| 15 | 0.007 | | 0.97 | | −202.68 | | 2.25 | |
| 16 | 0.007 | | 4.25 | | −73.53 | | 2.25 | |
| 17 | 0.006 | | 4.39 | | −97.81 | | 2.25 | |
| 18 | 0.005 | | 4.57 | | −37.84 | | 2.50 | |
| 19 | 0.004 | | 3.01 | | −207.43 | | 2.50 | |
| 20 | 0.004 | | 3.49 | | 82.21 | | 2.75 | |
| After the Abrupt Change of Channel Parameters ||||||||| 
| 1 | 0.283 | 0.282 | 4.58 | 4.70 | 150.00 | 150.39 | 0.00 | 0.00 |
| 2 | 0.268 | 0.269 | 2.93 | 0.11 | 193.84 | 193.79 | 0.50 | 0.50 |
| 3 | 0.245 | 0.244 | 0.10 | 4.95 | −128.99 | −128.91 | 0.75 | 0.75 |
| 4 | 0.144 | 0.095 | 5.69 | 2.30 | −183.17 | −181.33 | 0.50 | 0.50 |
| 5 | 0.141 | 0.074 | 3.69 | 4.20 | −187.17 | −189.92 | 0.75 | 0.75 |
| 6 | 0.081 | 0.075 | 5.97 | 1.46 | −210.09 | −211.84 | 0.50 | 0.50 |
| 7 | 0.046 | 0.039 | 2.31 | 5.44 | 147.34 | 146.52 | 1.00 | 1.00 |
| 8 | 0.033 | 0.038 | 5.68 | 3.39 | −192.61 | 32.23 | 1.25 | 1.75 |
| 9 | 0.032 | | 4.51 | | 31.78 | | 1.50 | |

TABLE 6-continued

| Path No: q | $\alpha_{q,k}$ | $\hat{\alpha}_{q,k}$ | $\phi_{q,k}$ (radians) | $\hat{\phi}_{q,k}$ (radians) | $v_{q,k}$ (Hz) | $\hat{v}_{q,k}$ (Hz) | $\tau_{q,k}$ (chips) | $\hat{\tau}_{q,k}$ (chips) |
|---|---|---|---|---|---|---|---|---|
| 10 | 0.032 | | 5.95 | | −185.10 | | 1.75 | |
| 11 | 0.029 | | 0.53 | | 13.74 | | 2.00 | |
| 12 | 0.020 | | 2.85 | | −207.39 | | 1.75 | |
| 13 | 0.020 | | 2.78 | | −134.02 | | 1.75 | |
| 14 | 0.017 | | 2.22 | | 53.69 | | 2.00 | |
| 15 | 0.007 | | 0.97 | | −153.71 | | 2.25 | |
| 16 | 0.007 | | 4.25 | | 43.88 | | 2.25 | |
| 17 | 0.006 | | 4.39 | | −88.86 | | 1.75 | |
| 18 | 0.005 | | 4.57 | | −204.81 | | 2.25 | |
| 19 | 0.004 | | 3.01 | | −192.21 | | 2.00 | |
| 20 | 0.004 | | 3.49 | | 57.89 | | 2.75 | |

Table 6 illustrates the actual and the estimated multipath channel parameters for an urban downlink communication channel which exhibits an abrupt change in its multipath structure. The communication rate is 307.2 Kbps. In the table, results are given for both before and after an abrupt change in the channel. The estimated path parameters are denoted with a "^" over their respective symbol.

As seen from the tabulated results, even for the cases of abrupt changes in the communication channel parameters, in accordance with the present invention reliable estimates of the channel parameters corresponding to the stronger multipath components, which are of practical interest, can be obtained. More importantly, as seen from the bit error rate plots given in FIGS. 11, 13, 14 and 15, significantly better performance at all of the simulated communication rates can be obtained in accordance with the present invention.

Figure 11:
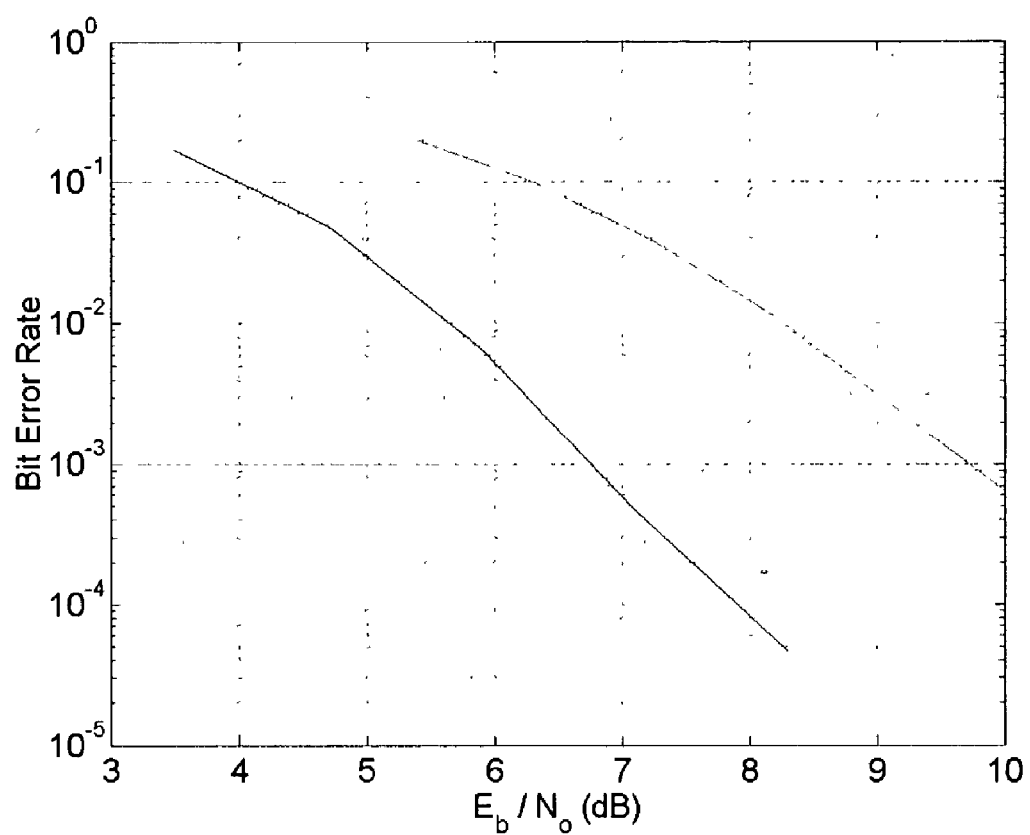
FIG. 11 is a plot of the computed bit error rates for a CDMA-2000 uplink communication at the rate of 307.2 Kbps in an urban channel environment. The upper curve corresponds to the bit error rate of a conventional rake receiver, and the lower curve corresponds to the bit error rate achieved in accordance with the present invention.
Figure 13:
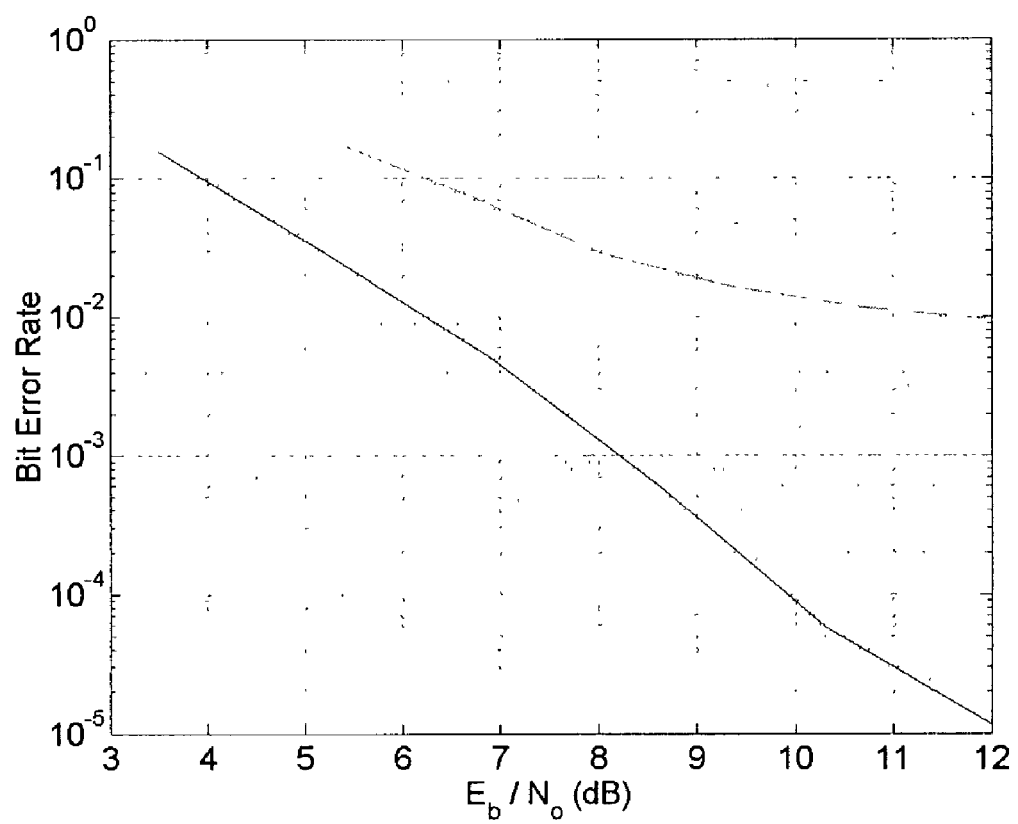
FIG. 13 is a plot of the computed bit error rates for a CDMA-2000 uplink communication at the rate of 307.2 Kbps in an urban channel environment where the channel experiences an abrupt change as shown in FIG. 12. The upper curve corresponds to the bit error rate of a conventional rake receiver, and the lower curve corresponds to the bit error rate achieved in accordance with the present invention.

In particular, FIG. 11 is a plot of the computed bit error rates for a CDMA-2000 uplink communication at the rate of 307.2 Kbps in an urban channel environment. The upper curve corresponds to the bit error rate of a conventional rake receiver, and the lower curve corresponds to the bit error rate achieved in accordance with the present invention. FIG. 13 is a plot of the computed bit error rates for a CDMA-2000 uplink communication at the rate of 307.2 Kbps in an urban channel environment where the channel experiences an abrupt change, as shown in FIG. 12. The upper curve corresponds to the bit error rate of a conventional rake receiver, and the lower curve corresponds to the bit error rate achieved in accordance with the present invention.

Figure 14:
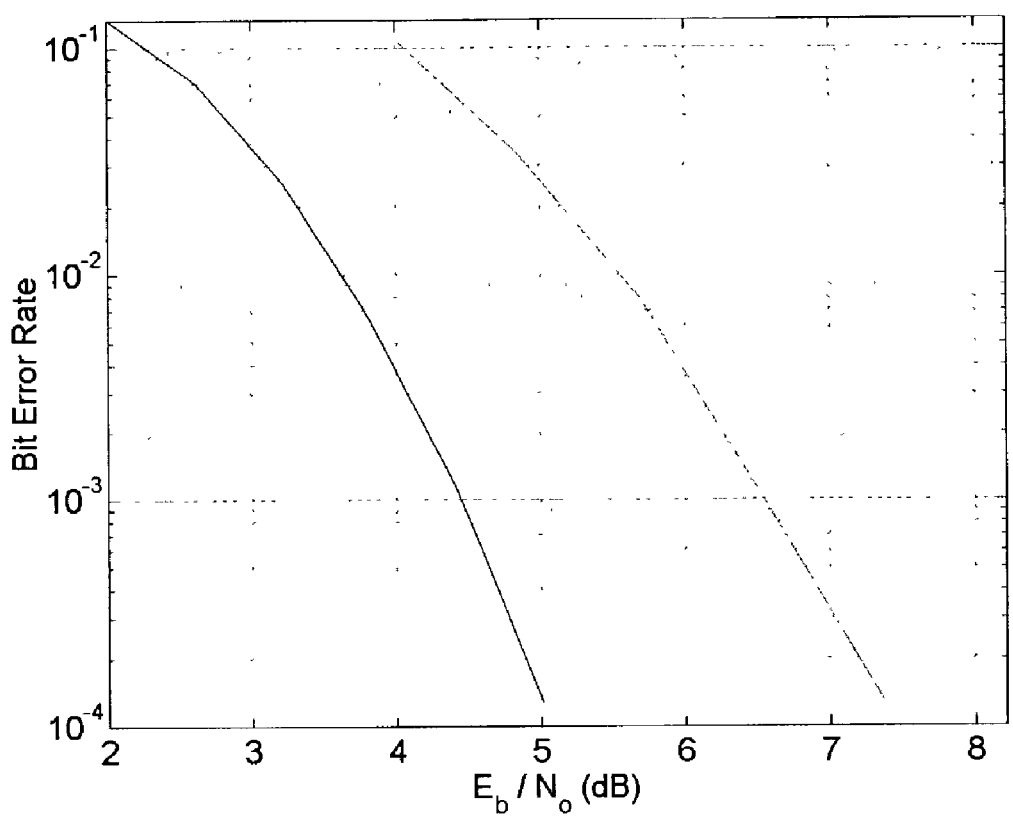
FIG. 14 is a plot of the computed bit error rates for a CDMA-2000 uplink communication at the rate of 153.6 Kbps in the urban channel environment described in Table 2. The upper curve corresponds to the bit error rate of a conventional rake receiver, and the lower curve corresponds to the bit error rate achieved in accordance with the present invention.
Figure 15:
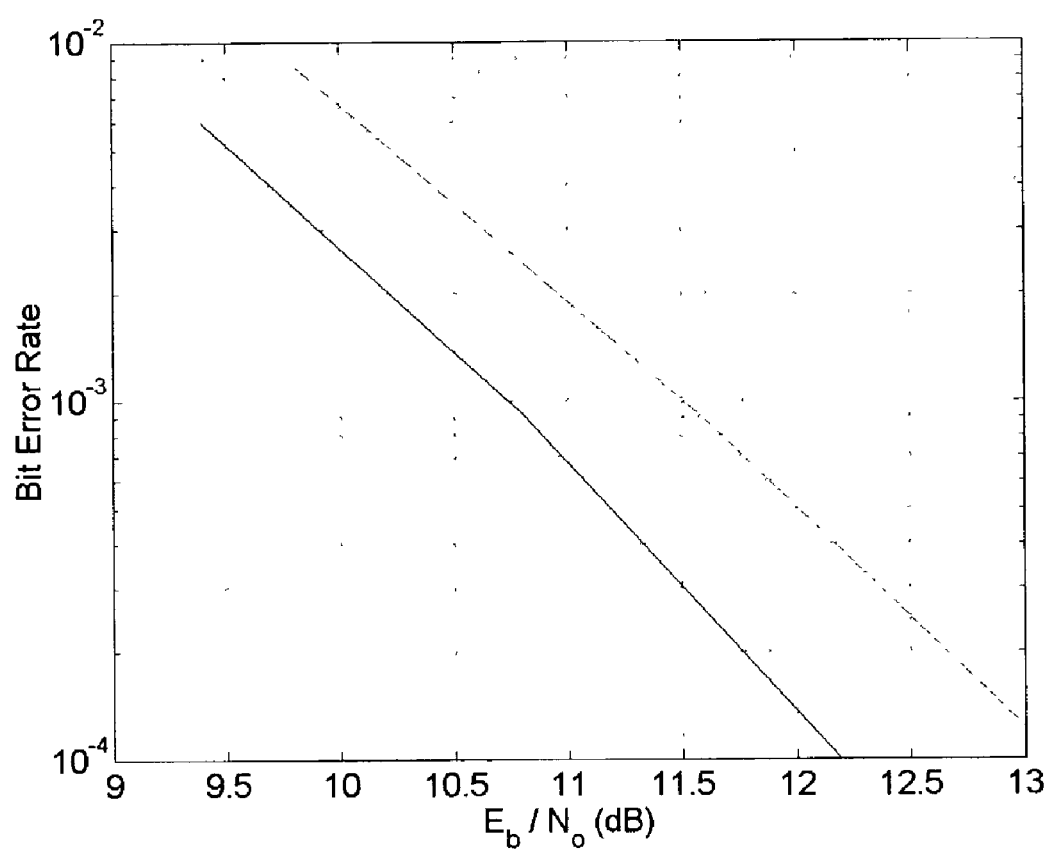
FIG. 15 is a plot of the computed bit error rates for a CDMA-2000 downlink communication at the rate of 307.2 Kbps in an urban channel environment where the channel experiences an abrupt change, as described in Table 6. The upper curve corresponds to the bit error rate of a conventional rake receiver, and the lower curve corresponds to the bit error rate of the CDMA receiver in accordance with the present invention.

FIG. 14 is a plot of the computed bit error rates for a CDMA-2000 uplink communication at the rate of 153.6 Kbps in the urban channel environment described in Table 2. The upper curve corresponds to the bit error rate of a conventional rake receiver, and the lower curve corresponds to the bit error rate achieved in accordance with the present invention. FIG. 15 is a plot of the computed bit error rates for a CDMA-2000 downlink communication at the rate of 307.2 Kbps in an urban channel environment where the channel experiences an abrupt change, as described in Table 5. The upper curve corresponds to the bit error rate of a conventional rake receiver, and the lower curve corresponds to the bit error rate of the CDMA receiver in accordance with the present invention.

Furthermore, it is important to note that the performance improvement exhibited by the system and method of the present invention increases with the rate of the communication. Since, the purpose of the next generation wireless communication systems is to provide communication at higher data rates, the invented receiver is expected to have significant impact on the success of the next generation spread spectrum communication systems. As pointed above, although the above-described simulations pertain specifically to a CDMA-2000 communication system, similar results can be obtained for other spread-spectrum communication systems, such as the W-CDMA and HDR.

The present invention provides significant advantages over conventional rake receivers employed in CDMA systems. Most importantly, the channel compensator of the present invention provides reliable estimates to the multipath channel parameters such as delay, Doppler shift, phase and magnitude that are used to mitigate effects of a multipath channel on the received information-carrying signals. Moreover, the estimated parameters can be passed onto another subsystem of the receiving unit to perform other tasks. For example, a histogram of the channel parameters can be created and updated based on the estimated set of parameters.

Furthermore, the disclosed receiver infrastructure may be incorporated into a conventional CDMA base receiver unit as shown in FIG. 8. The multitude of rake receivers in an existing conventional base receiver unit can be replaced with a multitude of the invented receivers each of which is designated to a specific mobile user.

MATHEMATICAL BACKGROUND

Fast Computation of the Cross Ambiguity Function on Arbitrary Line Segments

Figure 16:
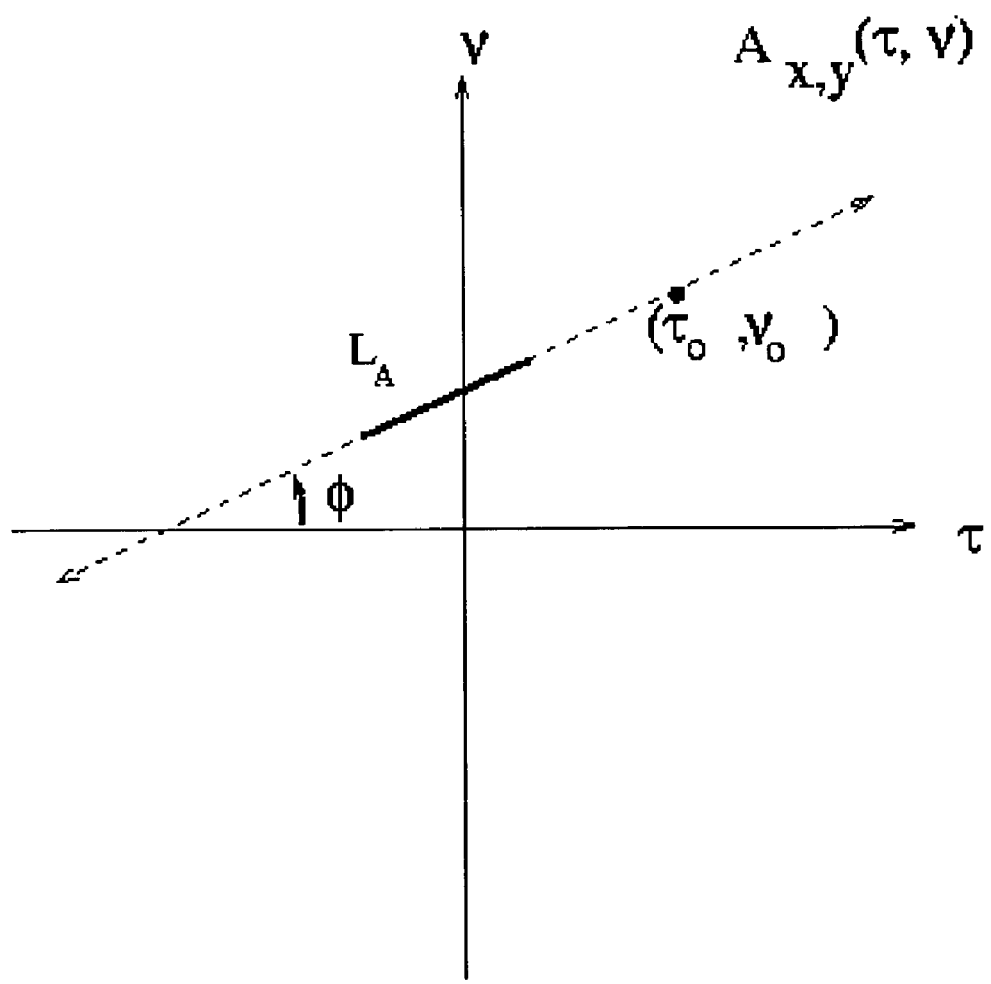
FIG. 16 illustrates an arbitrary line segment $L_A$ on which samples of the cross-ambiguity function can be computed efficiently in accordance with the present invention.

Suppose that it is desired to compute the samples of the cross ambiguity function (AF) of the two signals y(t) and z(t) on a line segment $L_A$ shown in FIG. 16. This non-radial slice of the cross AF function is given as $$A_{yz}(v_o + \lambda \cos\phi, \tau_o + \lambda \sin\phi) = \int y(t+(\tau_o+\lambda \sin\phi)/2)z^*(t-(\tau_o+\lambda \sin\phi)/2)e^{j2\pi(v_o+\lambda \cos\phi)t}dt =$$
$$A_{\tilde{y}\tilde{z}}(\lambda \cos\phi, \lambda \sin\phi),$$

where $A_{\tilde{y}\tilde{z}}(\lambda \cos\phi, \lambda \sin\phi)$ is the radial slice of the cross-AF of the signals $\tilde{y}(t)$ and $\tilde{z}(t)$:

$$\tilde{y}(t) = y(t+\tau_o/2)e^{j\pi v_o t}$$

$$\tilde{z}(t) = z(t-\tau_o/2)e^{-j\pi v_o t}.$$

The radial-slice of the $A_{\tilde{y}\tilde{z}}(v,\tau)$ is the 1-D inverse FT of the $\phi$-Radon projection of the $W_{\tilde{y}\tilde{z}}(t,f)$ $$A_{\tilde{y}\tilde{z}}(\lambda \cos\phi, \lambda \sin\phi) = \int P_{\tilde{y}\tilde{z}}(r,\phi)e^{j2\pi\lambda r}dr,$$

where the $\phi$-Radon projection satisfies the following relation with the FrFTs of $\tilde{y}(t)$ and $\tilde{z}(t)$:

$$P_{\tilde{y}\tilde{z}}(r,\phi) = \tilde{y}_a(r)\tilde{z}_a^*(r), a = \frac{2}{\pi}\phi.$$

Then, the required non-radial slice of the $A_{\tilde{y}\tilde{z}}(\nu,\tau)$ can be obtained as $$A_{\tilde{y}\tilde{z}}(\nu_o + \lambda \cos\phi, \tau_o + \lambda \sin\phi) = \int \tilde{y}_a(r)\tilde{z}_a^*(r)e^{j2\pi\lambda r}dr.$$

Discretization of this expression yields a fast computational algorithm.

Fast Computation of the Ambiguity Function on Arbitrary Line Segments

This section provides an efficient algorithm to compute uniformly spaced samples of the ambiguity function (AF) located on an arbitrary line segment. By using the proposed algorithm, for an input sequence of length N, it is possible to compute the samples of the AF on an arbitrary line segment in N log N flops.

The proposed approach is presented as follows: first is given the well known projection-slice relationship between the Wiegner distribution (WD) and the AF domains. Then, the projections in the WD domain are related to the fractional Fourier transformation of the signals involved. Finally, the obtained continuous-time relationship is discretized to enable the use of fast fractional Fourier transformation algorithms.

The Radon-Cross-Wigner Transform

Figure 18:
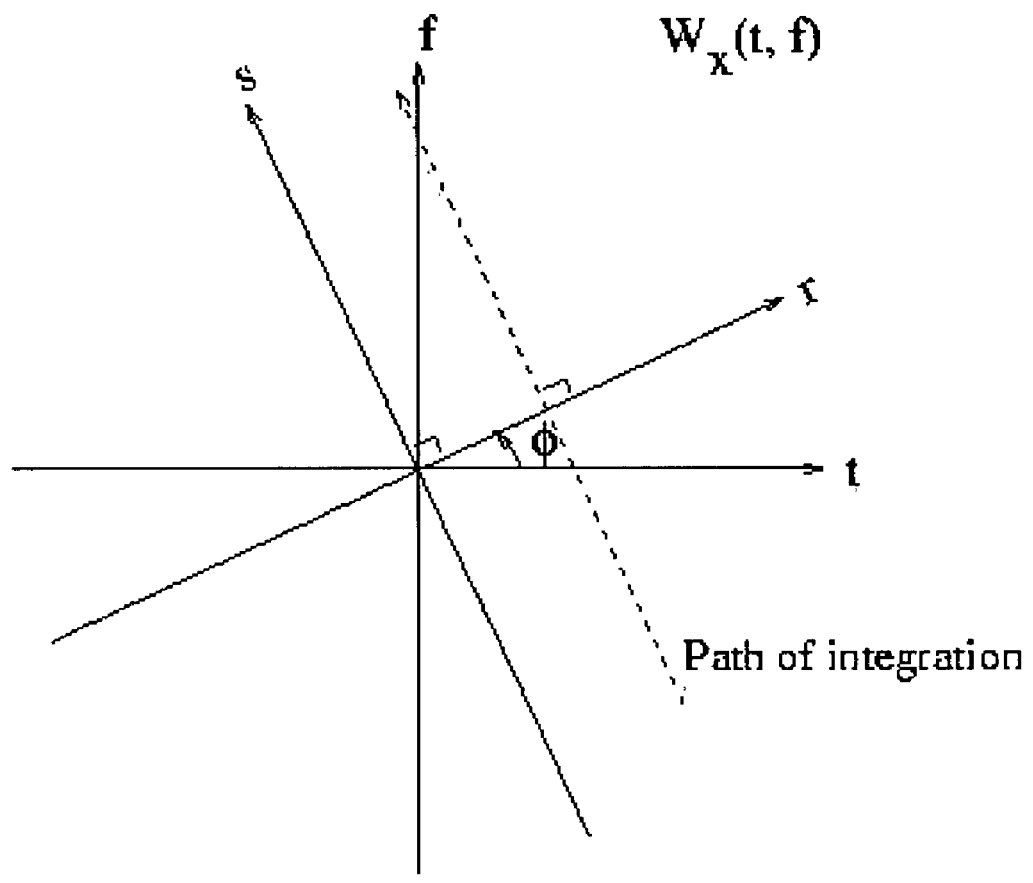
FIG. 18 illustrates the Radon transform geometry on the Wigner distribution plane at an angle $\phi$ in accordance with the present invention.

The Radon-Wigner transform (RWT) or Radon transformation of the Wigner distribution has been introduced for the analysis and classification of multicomponent chirp signals in noise. In a series of papers, Woods and Barry investigated RWT and some of its applications in multicomponent signal analysis, time-varying filtering and adaptive kernel design [16,17,18]. As a generalization, the Radon-cross-Wigner transform (RCWT) of two signals y(t) and z(t) can be defined as the Radon transform of their cross-Wigner distribution: using the geometry in FIG. 18, RWT can be written as $$P_{yz}(r,\phi) = \int W_{yz}(r\cos\phi - s\sin\phi, r\sin\phi + s\cos\phi)ds. \quad (19)$$

The projection-slice theorem establishes an important link between the projections of the CWD and the slices of the CAF: the 1-D Fourier Transform of the projection $P_{yz}(r,\phi)$ with respect to the variable r is the radial slice of the cross-ambiguity function at an angle $\phi + \pi/2$:

$$\int P_{yz}(r,\phi)e^{-j2\pi r\lambda}dr = A_{yz}^P(\lambda, \phi+\pi/2), \quad (20)$$

where $A_{yz}^P(\lambda,\phi) \square A_{yz}(\lambda\cos\phi, \lambda\sin\phi)$ is the polar representation of the CAF. Therefore, once the projection $P_{yz}(r,\phi)$, is available, one can use FFT to efficiently approximate the samples on the radial slice of the CAF. However, to have a practically useful algorithm, one has to efficiently obtain the RCWT as well. Fortunately, $P_{yz}(r,\phi)$, can be computed directly from the time signals y(t) and z(t) by using the Fractional Fourier Transformation (FrFT):

$$P_{yz}(r,\phi) = y_a(r)z_a^*(r), \text{ for } a = \frac{2\phi}{\pi} \quad (21)$$

where $P_{yz}(r,\phi)$ is the $\phi$-Radon projection of the CWD given by (5), and $Y_a(r)$, $Z_a(r)$ are the $a^{th}$-order FrFTs [19] of the signals y(t) and z(t).

Based on this relationship, the next section provides an approximate but efficient algorithm for the computation of AF samples located on an arbitrary (and possibly non-radial) line segment.

Computation of the Ambiguity Function Along Arbitrary Line Segments

Figure 19:
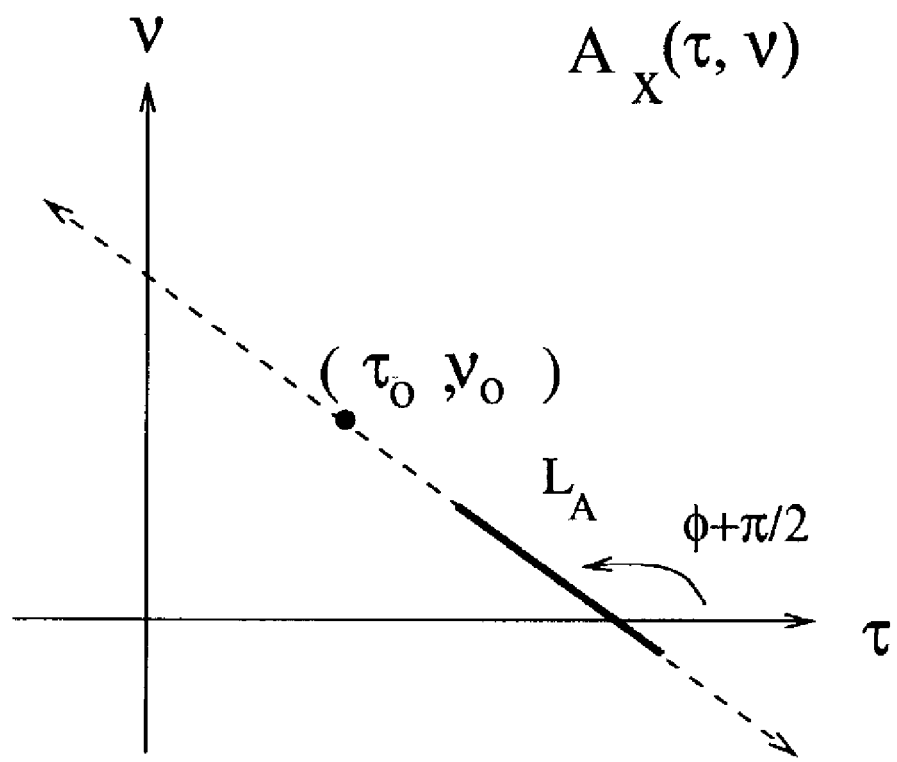
FIG. 19 illustrates an arbitrary line segment $L_A$ on which samples of the cross-ambiguity function can be computed efficiently in accordance with the present invention.

Consider the case of computing the samples of the AF $A_x(\tau,\nu)$ along the line segment $L_A$ shown in FIG. 19. The following parameterization for the line segment $L_A$ will be used in the derivations:

$$L_A = \{(\tau,\nu) | \tau = \tau_o - \lambda\sin\phi, \nu = \nu_o + \lambda\cos\phi, \lambda \in [\lambda_1, \lambda_2]\},$$

where $(\tau_o, \nu_o)$ is an arbitrary point, which lies on $L_A$ and $\phi + \pi/2$ is the angle between $L_A$ and $\tau$-axis. Using this parameterization of $L_A$ and the definition of the AF, the non-radial slice of the AF, which lies on the line segment $L_A$ can be written as $$A_x(\tau_o - \lambda\sin\phi, \nu_o + \lambda\cos\phi) = A_{yz}^P(\lambda, \phi + \pi/2), \quad (22)$$

where $A_{yz}^P(\lambda, \phi + \pi/2)$ is the radial slice of the cross-ambiguity function of the following time-domain signals y(t) and z(t)

$$y(t) = x(t + \tau_o/2)e^{-j\pi\nu_o t}$$

$$z(t) = x(t - \tau_o/2)e^{j\pi\nu_o t}. \quad (23)$$

Thus, the non-radial slice of $A_x(\tau,\nu)$ is equal to the radial slice of the $A_{yz}(\tau,\nu)$ where both of the two slices are in parallel. Hence, using (20) and (21) in (22), one obtains the following expression for the non-radial slice of the AF $A_x(\tau,\nu)$:

$$A_x(\tau_o - \lambda\sin\phi, \nu_o + \lambda\cos\phi) = \int y_a(r)z_a^*(r)e^{-j2\pi r\lambda}dr. \quad (24)$$

To obtain a form suitable for digital computation, the above integral is replaced with its uniform Riemann summation. For an equally valid approximation at all angles $\phi$, it is assumed below that prior to obtaining its samples, x(t) is scaled so that the Wigner domain supports of x(t), y(t) and z(t) are approximately confined into a circle with radius $\Delta_x/2$ centered at the origin. For x(t) with approximate time and band-width of $(\Delta_t)$ and $(\Delta_f)$ respectively, the required scaling is x(t/s) where $$s = \sqrt{\Delta_f/\Delta_t}[16].$$

After the scaling, the band-width of the signal $y_a(r)z_a^*(r)$ is given as $2\Delta_x$. Therefore the integral (24) can be approximated with a discrete-Fourier transformation. This discrete-Fourier transformation relation can be further discretized (in the variable $\lambda$) to obtain the following expression for the N' uniformly spaced samples of AF on the line $$L_A : A_x(\tau_k, \nu_k) = \frac{1}{2\Delta_x} \sum_{n=-N}^{N} y_a(n/(2\Delta_x))z_a^*(n/(2\Delta_x))e^{-j\frac{\pi}{\Delta_x}\lambda_k n}. \quad (25)$$

where $(\tau_k, \nu_k) = (\tau_o - \lambda\sin\phi, \nu_o + \lambda\cos\phi),$ $$\lambda_k \square \lambda_1 + k\frac{\lambda_2 - \lambda_1}{N' - 1} \text{ for } 0 \leq k \leq N' - 1 \text{ and}$$

$N \geq \Delta_x^2$ is an integer. After the discretization, the obtained form lends itself for an efficient digital computation since the required samples of the FrFTs, $y_a(n/(2\Delta_x))$, $z_a(n/(2\Delta_x))$, $-N \leq n \leq N$, can be computed using the recently developed fast computation algorithm [6] in O(N log N) flops (complex multiplication and addition), and the summation in Eq. (25)

can be computed in O(N log N) flops using the chirp-z transform algorithm [20] (The computational complexity is given for N'≦N, which is usually the case). Therefore the overall cost of computing the samples of the AF along any line segment is O(N log N) flops.

The foregoing description of the preferred embodiments of the present invention has been presented for purposes of illustration and description. It is not intended to be exhaustive nor to limit the invention to the precise form disclosed. Many modifications and variations will be apparent to those skilled in the art. The embodiments were chosen and described in order to best explain the principles of the invention and its practical applications, thereby enabling others skilled in the art to understand the invention. Various embodiments and modifications that are suited to a particular use are contemplated. It is intended that the scope of the invention be defined by the accompanying claims and their equivalents.

What is claimed is:

1. A method for wireless communication in a multipath environment, comprising the steps of:
   a) at a receiver having stored at least one pilot signal associated with a transmitter, receiving signals corresponding to at least one propagation path of a signal transmitted from a transmitter;
   b) estimating a set of propagation parameters for the at least one propagation path, the step of estimating comprising:
      (i) generating a windowed version of the received signals;
      (ii) computing samples of a cross-ambiguity function of one of the stored pilot signals and the received windowed signals;
      (iii) estimating a set of propagation parameters for the at least one propagation path based on information about one or more peaks of the cross-ambiguity function based on the computed samples; and
   c) compensating effects of multipath propagation on information-carrying signals from the transmitter using the estimated set of propagation parameters for the at least one propagation path.

2. The method of claim 1, wherein the set of estimated propagation parameters associated with each propagation path comprises one or more of: amplitude, phase, delay and frequency parameters.

3. The method of claim 1, wherein the received signals correspond to distinct propagation paths of a transmitted signal.

4. The method of claim 1, wherein the step of compensating effects of multipath propagation comprises the steps of:
   providing one or more partially compensated received signals, by one or more of the following steps:
      i. frequency-shifting a received signal by a predetermined frequency associated with a corresponding propagation path to generate a Doppler-corrected version thereof;
      ii. time-shifting the received signal by a predetermined delay associated with the corresponding propagation path to generate a time-aligned version thereof;
      iii. phase-correcting the received signal by a predetermined phase associated with its corresponding propagation path to generate a phase-aligned version thereof.

5. The method of claim 4, further comprising the step of computing a weighted combination of two or more partially compensated signals.

6. The method of claim 1, wherein step (a) further comprises the step of down-converting the received signals to an intermediate frequency.

7. The method of claim 1, wherein the peaks of the cross-ambiguity function are determined via one of 1-dimensional and 2-dimensional search of the computed samples.

8. The method of claim 1, wherein the samples of the cross-ambiguity function are computed recursively.

9. The method of claim 1, wherein a range of determined peaks of the computed cross-ambiguity function is defined by at least one of a carrier frequency, a speed of relative motion between a transmitter and a receiver, and a delay interval between reception of first and subsequent signals.

10. The method of claim 1, wherein step (b) further comprises the steps of computing a quadratic interpolation of the amplitude of the computed samples of the cross-ambiguity function.

11. The method of claim 1, wherein at least one received signal is a Code Division Multiple Access (CDMA) signal.

12. The method of claim 1, further comprising the step of extracting information from the signal received by the receiver.

13. The method of claim 1, wherein step (b) is performed every $T_e$ seconds, which interval is selected so that a multipath channel is substantially stationary.

14. The method of claim 13, wherein at least one received signal is a Code Division Multiple Access (CDMA) signal and the interval $T_e$ is equal to the duration of the scrambling long code of the CDMA system.

15. The method of claim 1, wherein the step of estimating further comprises generating a windowed version of the stored pilot signals.

16. The method of claim 15, wherein the windowed versions of the transmitted pilot and received signals comprise equal-length portions of the transmitted pilot and received signals.

17. A method for estimating channel propagation parameters, comprising the steps of:
   a) at a receiver having a copy of a predetermined transmitter signal, receiving at least one signal corresponding to at least one propagation path of the predetermined transmitter signal;
   b) computing samples of a cross-ambiguity function of the receiver copy of the transmitter signal and the at least one received signal; and
   c) determining one or more local peaks of the cross-ambiguity function based on the computed samples, each peak providing an estimate of a set of channel propagation parameters corresponding to a distinct propagation path, wherein a range of determined peaks of the computed cross-ambiguity function is defined by at least one of: a carrier frequency, a speed of relative motion between a transmitter and a receiver, and a delay interval between reception of first and subsequent signals.

18. The method of claim 17, wherein the predetermined transmitter signal is a pilot signal in a Code Division Multiple Access (CDMA) communication system.

19. The method of claim 17, wherein the set of estimated propagation parameters associated with a distinct propagation path comprises at least one of amplitude, delay, phase and frequency parameters.

20. The method of claim 17 further comprising the step of applying a windowing function to the receiver copy of the transmitter signal and the received signals to generate equal-length signal portions.

21. The method of claim 17, wherein the determined peaks of the cross-ambiguity function are determined via 1-dimensional search.

22. The method of claim 17, wherein the samples of cross-ambiguity function are computed recursively.

23. The method of claim 17, further comprising the step of compensating effects of multipath propagation on information-carrying signals from the transmitter using the estimated set of propagation parameters for the at least one propagation path.

24. A receiver for use in wireless mobile communications, comprising:
   a) a channel estimator providing estimates of multipath propagation parameters of transmitted signal(s) using a signal known to be transmitted and a received signal, the channel estimator:
      (i) computing samples of a cross-ambiguity function of one of stored transmitted signal(s) and windowed version of the received signal, and
      (ii) estimating a set of propagation parameters for a propagation path of the transmitted signal(s) based on information about one or more peaks of the cross-ambiguity function;
   b) a channel reconstructor providing a reconstructed signal, in which the effects of multipath propagation on the received windowed signal are compensated by one or more of: amplitude-scaling, phase-correcting, time- and frequency-shifting of the received windowed signal; and
   c) a correlation detector extracting transmitted information based on the output of the channel reconstructor.

25. The receiver of claim 24, wherein the wireless mobile communication is a Code Division Multiple Access (CDMA)-based communication and the estimates of multipath propagation parameters are computed using the pilot signal of a transmitter.

26. The receiver of claim 25, wherein information-carrying signals from a transmitter are reconstructed based on estimated propagation parameters of the pilot signal.

27. The receiver of claim 24, wherein the channel estimator provides estimates of multipath propagation parameters based on the computation of samples of the cross-ambiguity function of received windowed signal and a known copy of the pilot signal.

28. The receiver of claim 27, adapted for use in a base station of a Code Division Multiple Access (CDMA) communication system.

* * * * *